(12) United States Patent
Hanawa et al.

(10) Patent No.: US 11,792,650 B2
(45) Date of Patent: Oct. 17, 2023

(54) UNAUTHORIZED COMMUNICATION DETECTION APPARATUS AND RECORDING MEDIUM

(71) Applicant: Hitachi, Ltd., Tokyo (JP)

(72) Inventors: Hiroki Hanawa, Tokyo (JP); Kenji Naka, Tokyo (JP); Tsuyoshi Taniguchi, Tokyo (JP)

(73) Assignee: Hitachi, Ltd., Tokyo (JP)

(*) Notice: Subject to any disclaimer, the term of this patent is extended or adjusted under 35 U.S.C. 154(b) by 927 days.

(21) Appl. No.: 16/565,574

(22) Filed: Sep. 10, 2019

(65) Prior Publication Data

US 2020/0275278 A1 Aug. 27, 2020

(30) Foreign Application Priority Data

Feb. 26, 2019 (JP) .................................. 2019-032743

(51) Int. Cl.
*H04W 12/12* (2021.01)
*H04W 12/121* (2021.01)
(Continued)

(52) U.S. Cl.
CPC .......... *H04W 12/121* (2021.01); *G06N 5/022* (2013.01); *G06N 20/20* (2019.01)

(58) Field of Classification Search
CPC .. H04W 12/121; H04W 12/088; G06N 5/022; G06N 20/20; H04L 63/0227; H04L 63/1425

See application file for complete search history.

(56) References Cited

U.S. PATENT DOCUMENTS 9,049,221 B1* 6/2015 Yen .................... G06F 16/951
9,635,039 B1* 4/2017 Islam .................. H04L 63/145
(Continued)

FOREIGN PATENT DOCUMENTS

JP  2007-96735 A   4/2007
JP  2017-84296 A   5/2017
(Continued)

OTHER PUBLICATIONS

Japanese-language Office Action issued in Japanese Application No. 2019-032743 dated Feb. 8, 2022 with English translation (11 pages).

*Primary Examiner* — Khalid M Almaghayreh
(74) *Attorney, Agent, or Firm* — Crowell & Moring LLP

(57) ABSTRACT

An unauthorized communication detection apparatus comprises: a reception module configured to receive operational data; a transmission module configured to transmit the operational data; an acquisition module configured to acquire a correction value for correcting a determination expression for calculating a score for determining whether the operational data is involved in unauthorized communication, based on a parameter for extending an application range of a specific learning model and on a specific feature amount corresponding to the specific learning model among a plurality of feature amounts of the operational data; a determination module configured to calculate the score based on the plurality of learning models, the plurality of feature amounts, and the correction value, and determine whether the operational data is involved in unauthorized communication based on the calculated score; and a transmission control module configured to control the transmission of the operational data based on a determination result.

15 Claims, 15 Drawing Sheets

(51) Int. Cl.
    *G06N 5/022*       (2023.01)
    *G06N 20/20*       (2019.01)

(56) References Cited

U.S. PATENT DOCUMENTS

| | | | | |
|---|---|---|---|---|
| 9,813,310 | B1* | 11/2017 | Sieracki | H04L 43/18 |
| 2005/0022000 | A1* | 1/2005 | Inomata | G06F 21/552 |
| | | | | 726/26 |
| 2007/0074272 | A1* | 3/2007 | Watanabe | H04L 63/1408 |
| | | | | 726/3 |
| 2010/0161537 | A1* | 6/2010 | Liu | H04L 43/028 |
| | | | | 709/224 |
| 2016/0261465 | A1* | 9/2016 | Gupta | H04L 43/08 |
| 2016/0323305 | A1* | 11/2016 | Koide | H04L 63/1408 |
| 2018/0112590 | A1* | 4/2018 | Hojo | F02D 41/2464 |
| 2018/0316623 | A1* | 11/2018 | Chen | H04L 67/5682 |
| 2019/0273749 | A1* | 9/2019 | Nishimoto | G06N 20/20 |
| 2020/0143232 | A1* | 5/2020 | Ito | G06N 3/084 |
| 2020/0175161 | A1* | 6/2020 | Giaconi | G06N 3/084 |
| 2021/0105201 | A1* | 4/2021 | Huang | H04L 41/142 |

FOREIGN PATENT DOCUMENTS

| | | |
|---|---|---|
| JP | 2018-7179 A | 1/2018 |
| WO | WO 2015/107861 A1 | 7/2015 |
| WO | WO 2016/147403 A1 | 9/2016 |
| WO | WO-2016147403 A1 * | 9/2016 |

\* cited by examiner

600

| n | NETWORK FEATURE AMOUNT Fn | | WEIGHT wn |
|---|---|---|---|
| 1 | DESTINATION IP ADDRESS | F1 | w1=50 |
| 2 | SOURCE IP ADDRESS | F2 | w2=50 |
| 3 | PROTOCOL | F3 | w3=0 |
| 4 | DESTINATION PORT | F4 | w4=0 |
| 5 | SOURCE PORT | F5 | w5=20 |
| 6 | DESTINATION MAC ADDRESS | F6 | w6=0 |
| 7 | SOURCE MAC ADDRESS | F7 | w7=30 |
| 8 | PACKET DATA SIZE | F8 | w8=10 |
| 9 | RECEPTION START TIME | F9 | w9=10 |
| 10 | NUMBER OF RECEIVED PACKETS PER SECOND | F10 | w10=10 |
| 11 | COMMUNICATION TIME PERIOD | F11 | w11=10 |

| DETERMINATION RESULT | THRESHOLD VALUE |
|---|---|
| NORMAL | 80 OR GREATER |
| DETECT | 20 TO 79 |
| BLOCK | LESS THAN 20 |

*Fig. 7*

| # | DESTINATION IP ADDRESS |
|---|---|
| 1 | 10.10.10.1 |
| 2 | 10.10.10.2 |

| # | SOURCE IP ADDRESS |
|---|---|
| 1 | 172.16.0.1 |
| 2 | 172.16.0.2 |

| # | PROTOCOL |
|---|---|
| 1 | TCP/IP |
| 2 | UDP/IP |

| # | DESTINATION PORT |
|---|---|
| 1 | 80 |
| 2 | 21 |

| # | SOURCE PORT |
|---|---|
| 1 | 54000 |
| 2 | 54001 |

| # | DESTINATION MAC ADDRESS |
|---|---|
| 1 | xx:xx:xx:xx:xx:xx |
| 2 | yy:yy:yy:yy:yy:yy |

| # | SOURCE MAC ADDRESS |
|---|---|
| 1 | aa:aa:aa:aa:aa:aa |
| 2 | bb:bb:bb:bb:bb:bb |

| # | MAXIMUM PACKET DATA SIZE (byte) |
|---|---|
| 1 | 1500 |
| 2 | 1000 |

| # | MINIMUM PACKET DATA SIZE (byte) |
|---|---|
| 1 | 60 |
| 2 | 500 |

| # | CUMULATIVE MAXIMUM PACKET SIZE (byte) |
|---|---|
| 1 | 10M |
| 2 | 5M |

| # | CUMULATIVE MINIMUM PACKET SIZE (byte) |
|---|---|
| 1 | 60 |
| 2 | 60 |

| # | RECEPTION START TIME (TIME UNIT) |
|---|---|
| 1 | 0 O'CLOCK |
| 2 | 12 O'CLOCK |

| # | MAXIMUM NUMBER OF RECEIVED PACKETS PER SECOND (pps) |
|---|---|
| 1 | 200 |
| 2 | 300 |

| # | MINIMUM NUMBER OF RECEIVED PACKETS PER SECOND (pps) |
|---|---|
| 1 | 1 |
| 1 | 1 |

| # | MAXIMUM COMMUNICATION TIME PERIOD (sec) |
|---|---|
| 1 | 100 |
| 2 | 50 |

| # | MINIMUM COMMUNICATION TIME PERIOD (sec) |
|---|---|
| 1 | 90 |
| 2 | 45 |

|  | $T'_{min} < T_{11} < T_{min}$ | $T_{min} < T_{11} < T_{max}$ | $T_{max} < T_{11} < T'_{max}$ |
|---|---|---|---|
| $P_{max} < P_{8-3} < P'_{max}$ | B1 $(r_p, r_t) = (0.4, 0.5)$ | B2 $(r_p, r_t) = (0.8, 1.0)$ | B3 $(r_p, r_t) = (0.8, 0.5)$ |
| $P_{min} < P_{8-3} < P_{max}$ | B4 $(r_p, r_t) = (1.0, 0.5)$ | B5 $(r_p, r_t) = (1.0, 1.0)$ | B6 $(r_p, r_t) = (1.0, 0.5)$ |
| $P'_{min} < P_{8-3} < P_{min}$ | B7 $(r_p, r_t) = (0.8, 0.5)$ | B8 $(r_p, r_t) = (0.8, 1.0)$ | B9 $(r_p, r_t) = (0.4, 0.5)$ |

*Fig. 17*

UNAUTHORIZED COMMUNICATION DETECTION APPARATUS AND RECORDING MEDIUM

CLAIM OF PRIORITY

The present application claims priority from Japanese patent application JP 2019-32743 filed on Feb. 26, 2019, the content of which is hereby incorporated by reference into this application.

BACKGROUND OF THE INVENTION

This invention relates to an unauthorized communication detection apparatus configured to detect illegal communication and a recording medium.

There has been adopted a technology called Internet of Things (IoT), in which things are connected to the Internet, in a wide range of fields. However, it is difficult to take security measures for an IoT device (things connected to the Internet) and an IoT system (at least one IoT device and its communication counterpart (for example, server)) for the following three reasons.

(1) An IoT device cannot execute complicated calculation processing for unauthorized communication detection with limited calculation capacity and memory capacity of the IoT device.

(2) It is difficult to take uniform security measures for IoT devices due to the diversity of IoT devices, applications, and protocols, and hence developers of each device vendor and each application are required to take security measures for themselves.

(3) Hitherto, a signature type capable of detecting and blocking unauthorized communication has been used for security measures against malware by defining and registering features (signatures) of known malware in advance. However, an environment in which an IoT device is used is set within a network having a limited bandwidth, and high availability is required for the environment. Therefore, as the number of IoT devices increases, it becomes more difficult to apply periodic signature update patches.

There is also security software of an anomaly type for performing detection control of unauthorized communication on an IoT gateway in a system in which an IoT device communicates via an IoT gateway. The anomaly type refers to a method of learning normal communication and determining communication different from the normal communication as an anomaly, and a method that can handle even an unknown attack method without requiring to update signatures. Specifically, generally in the anomaly type, the normal communication is defined by acquiring a network feature amount that can be obtained from a packet, and communication that exceeds a threshold value of the normal communication is regarded as an anomaly.

Therefore, even normal communication may be determined as anomalous communication when communication speed or communication traffic has been changed from a defined network feature amount. Meanwhile, the IoT gateway is coupled to a group of a plurality of IoT devices each mounted with a wireless device, and transfers data received from the IoT device to the server through a wired network or a wireless network. In general, it is known that the communication quality (bandwidth and packet loss rate) of the wired network is stable, but the communication quality of the wireless network is not stable due to surrounding noise (driving of a large-sized motor in a factory) and is constantly changed. This property causes the network feature amount of the normal communication to be changed from the network feature amount at the time of definition due to the influence of the wireless environment, and hence the fear of erroneously determining normal communication as anomalous communication may be increased.

In JP 2017-84296 A, there is disclosed a detection system configured to prevent an intrusion from an attacker server to an IoT device. This detection system includes a GW apparatus and a sensor terminal to be used by being coupled to a network through the GW apparatus. In the detection system, the following steps are executed: acquiring, by the GW apparatus, a sensor operation log of the sensor terminal; determining, by the GW apparatus, whether or not there is an anomaly in communication relating to the sensor terminal through use of the sensor operation log and packet header information on the communication relating to the sensor terminal; and stopping, by the GW apparatus, transmission and reception processing between the sensor terminal and an external network when determining that there is an anomaly in the communication relating to the sensor terminal.

In JP 2018-7179 A, there is disclosed a monitoring apparatus for monitoring each of an information technology (IT) network and an operational technology (OT) network. This monitoring apparatus acquires, from a firewall, a communication log of packets transmitted to and received from both the IT network and the OT network by each network. Then, the monitoring apparatus determines whether the acquired communication log is a communication log for the IT network or a communication log for the OT network based on at least any one of the following items included in the acquired communication log: the number of packet destinations, a packet size that is a packet data size, and a ratio between a download data size and an upload data size.

However, in the detection system of JP 2017-84296 A, when the communication performed between the sensor terminal and the external network through the IoT gateway is communication that involves continuously transmitting data at a short interval or communication that involves constantly transmitting data, a period of a sleep state of the sensor terminal managed by the IoT gateway is shortened. When the communication interval of normal communication is extended due to the influence of the wireless environment, the IoT gateway stops the transmission and reception processing for the communication. This causes the IoT gateway to lose sensing data. This leads to a risk that effective data utilization cannot be performed.

Further, in the detection system of JP 2017-84296 A, when the communication between the sensor terminal and the server has a feature of continuously transmitting data at a short interval, periods of the operation state and the sleep state of the sensor terminal managed by the IoT device are shortened. At this time, a communication time period of the communication between the sensor terminal and the server is extended due to the influence of the wireless environment, or the number of retransmission packets increases due to a packet loss. Therefore, normal communication may be continuously performed between the sensor terminal and the server during a period in which the IoT device manages the state of the sensor terminal as being in a sleep state, which leads to a fear that the normal communication may be erroneously determined as anomalous communication.

Meanwhile, in the monitoring apparatus of JP 2018-7179 A, a packet communication frequency and a communication interval are changed due to the influence of the wireless environment in a specific communication within the OT network. Therefore, when even one of the feature amounts of each communication in the OT network, which have been learned in advance by the monitoring apparatus, is exceeded, the monitoring apparatus erroneously determines that an anomaly has occurred and issues an alarm. This increases manual work required for investigation of the anomaly. In addition, the communication is not interrupted even after the determination that an anomaly has occurred, which leads to a fear that infection may spread during the investigation of the cause of the alarm.

Further, the monitoring apparatus of JP 2018-7179 A compares the feature amounts (packet size, packet communication frequency, and packet communication interval) of the communication, which have been learned in advance by the monitoring apparatus, and the communication log transmitted from the firewall for communication performed between the OT network and the server on the external network through the firewall, and determines that the communication is anomalous communication when even one of the feature amounts of the communication of a comparison target falls out of the range of the learned value.

The feature amounts of the communication, which have been learned in advance by the monitoring apparatus, are provided with a margin, and can handle fluctuations in the target communication, thereby being effective in a wired environment or a wireless environment in which the communication quality is stable to some extent. However, in an environment in which the communication quality is greatly changed in the wireless environment, a decrease in bandwidth may cause a decrease in packet communication frequency or an increase in communication interval. In addition, in an environment in which an increase in total number of received packets occur in combination with an increase in retransmission rate due to a packet loss, the monitoring apparatus becomes more liable to erroneously determine the normal communication as anomalous communication.

SUMMARY OF THE INVENTION

This invention has an object to reduce an erroneous determination rate exhibited when a learning result is used.

An unauthorized communication detection apparatus which is an aspect of the invention disclosed in the present application comprises: a reception module configured to receive operational data from a transmission source; a transmission module configured to transmit the operational data received by the reception module to a destination; an acquisition module configured to acquire a correction value for correcting a determination expression for calculating a score for determining whether the operational data is involved in unauthorized communication, based on a parameter for extending an application range of a specific learning model among a plurality of learning models relating to a feature amount of a learning data group and on a specific feature amount corresponding to the specific learning model among a plurality of feature amounts of the operational data received by the reception module; a determination module configured to calculate the score by the determination expression based on the plurality of learning models, the plurality of feature amounts, and the correction value acquired by the acquisition module, and determine whether the operational data is involved in unauthorized communication based on the calculated score; and a transmission control module configured to control the transmission of the operational data performed by the transmission module based on a determination result obtained by the determination module.

According to a representative embodiment of this invention, it is possible to reduce an erroneous determination rate exhibited when a learning result is used. Objects, configurations, and effects other than those described above will become more apparent by the following description of an embodiment.

BRIEF DESCRIPTION OF THE DRAWINGS

FIG. 6 is an explanatory diagram for illustrating an example of a first setting file.

FIG. 7 is an explanatory diagram for illustrating an example of a second setting file.

FIG. 10 is an explanatory diagram for illustrating an example of the learning model.

FIG. 17 is an explanatory diagram for illustrating an example of a fourth setting file.

DETAILED DESCRIPTION OF THE PREFERRED EMBODIMENTS

<Example of Configuration of IoT System>

Figure 1:
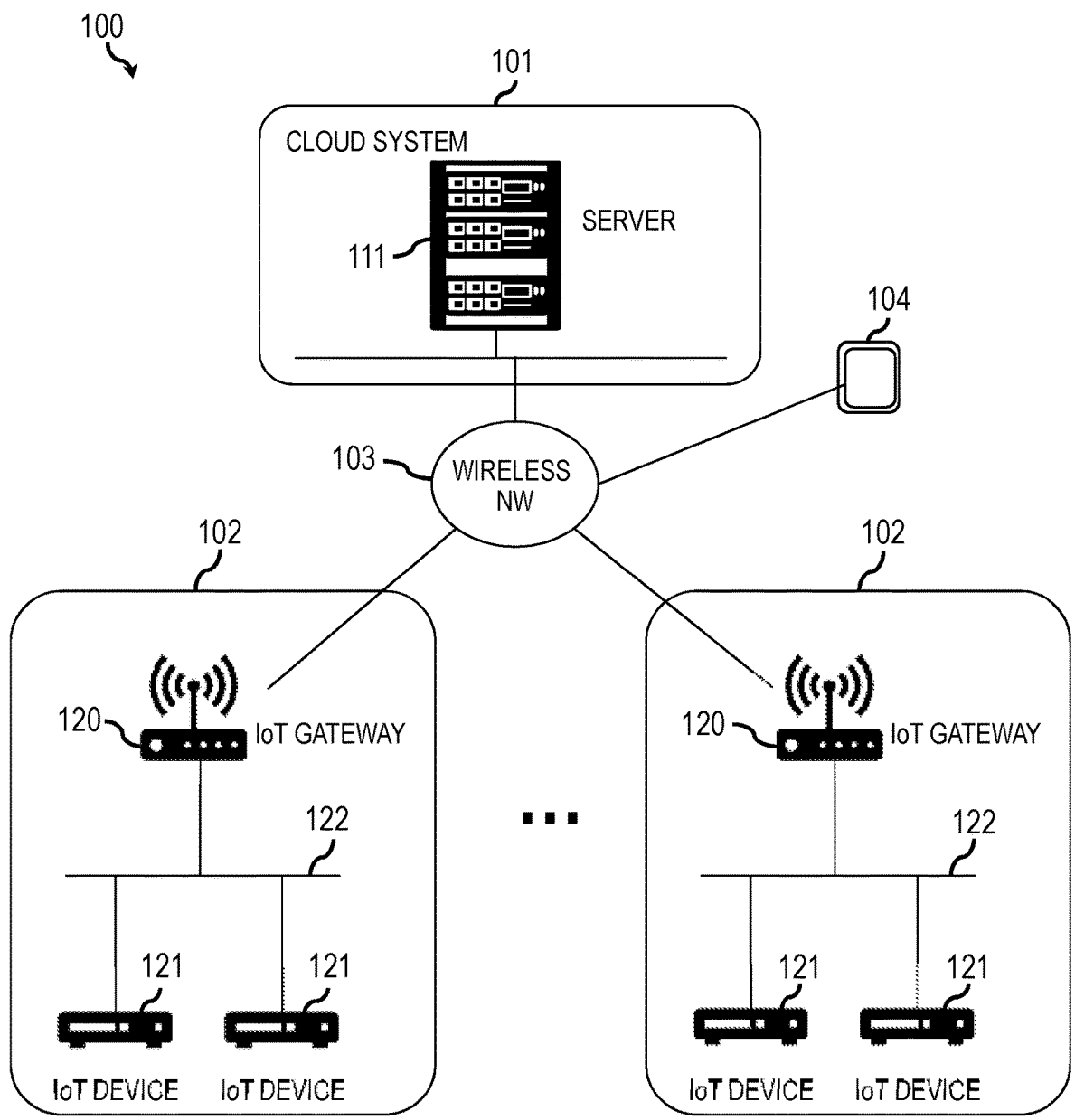
FIG. 1 is an explanatory diagram for illustrating an example of a system configuration of an IoT system.

FIG. 1 is an explanatory diagram for illustrating an example of a system configuration of an IoT system. An IoT system 100 includes a cloud system 101 and base location systems 102, which are coupled by a wireless network 103 so as to enable communication therebetween. A terminal 104 is coupled to the cloud system 101 and the base location systems 102 by the wireless network 103 so as to enable communication therebetween.

The cloud system 101 is at least one server 111 from which, for example, calculation resources, applications, and a data group can be used through the Internet or other such network in the form of a service. The server 111 transmits and receives a packet to/from an IoT device 121 via an IoT gateway 120.

Each of the base location systems 102 includes the IoT gateway 120 and at least one IoT device 121. The base location system 102 is installed in a base location, for example, a factory, an office, a public facility, or a general house. The IoT gateway 120 is an unauthorized communication detection apparatus configured to detect unauthorized communication between the server 111 or the terminal 104 and the IoT device 121. The IoT device 121 is a device configured to transmit data to the server 111 or the terminal 104 via the IoT gateway 120 and receive data from the server 111 or the terminal 104, via wired or wireless network 122. Examples of the IoT device 121 include a surveillance camera, a robot, a sensor configured to measure a temperature, a humidity, an amount of precipitation, or other such value relating to environment, and an elevator.

The terminal 104 is a personal computer, a smartphone, a tablet computer, or other such computer. For example, the terminal 104 is capable of receiving and displaying data detected by the IoT device 121 via the IoT gateway 120.

<Example of Hardware Configuration of IoT Gateway 120>

Figure 2:
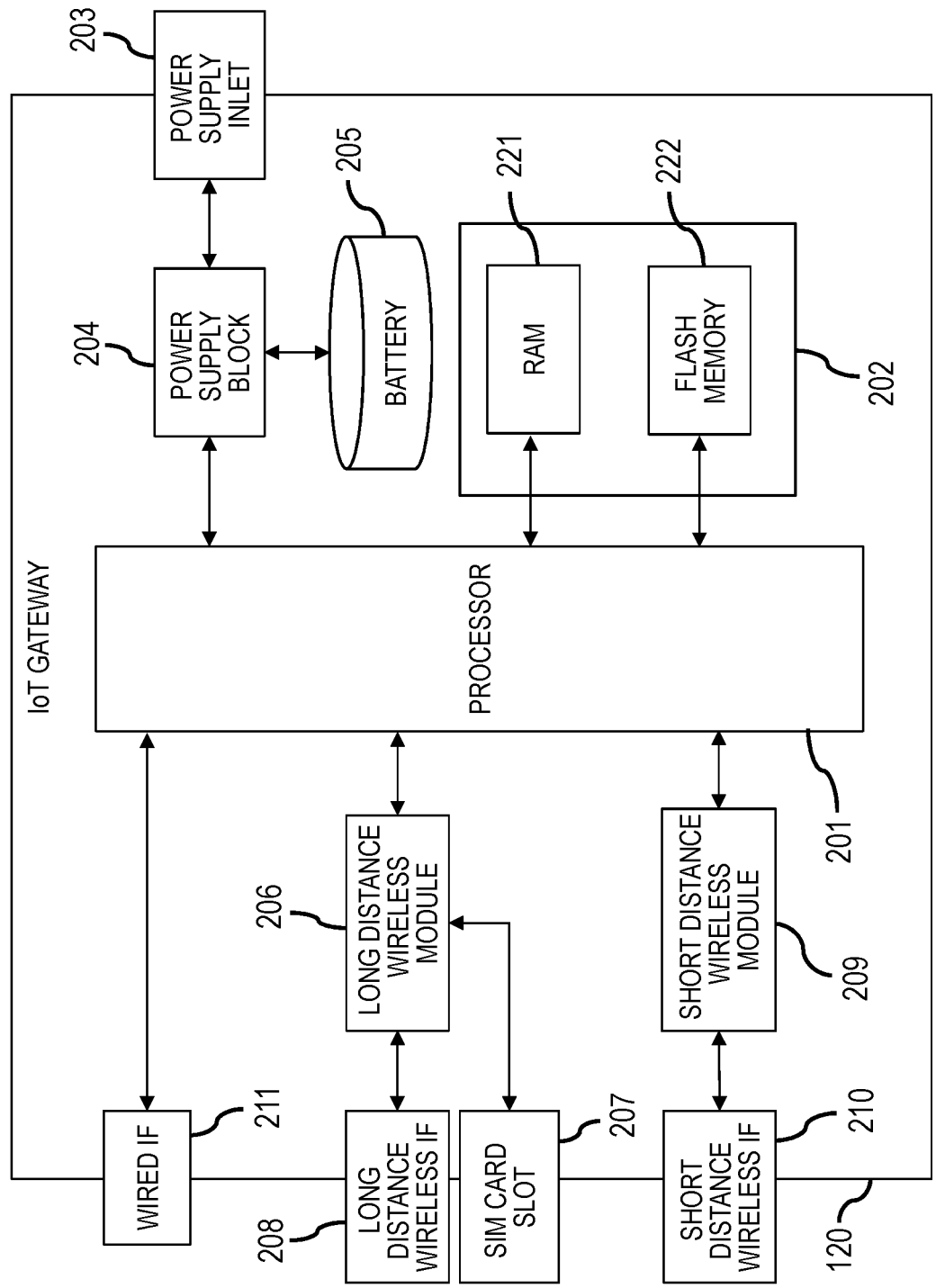
FIG. 2 is a block diagram for illustrating an example of a hardware configuration of the IoT gateway.

FIG. 2 is a block diagram for illustrating an example of a hardware configuration of the IoT gateway 120. The IoT gateway 120 includes a processor 201, a storage device 202, a power supply inlet 203, a power supply block 204, a battery 205, a long distance wireless module 206, a subscriber identity module (SIM) card slot 207, a long distance wireless interface (IF) 208, a short distance wireless module 209, a short distance wireless IF 210, and a wired IF 211.

The processor 201 controls the IoT gateway 120. The storage device 202 includes a random access memory (RAM) 221 and a flash memory 222. The RAM 221 serves as a work area for the processor 201. The flash memory 222 is a non-transitory or transitory recording medium configured to store different kinds of programs and data. The power supply inlet 203 is a connector to be coupled to a commercial power source. The power supply block 204 supplies electric power from the commercial power source to another module, and charges or discharges the battery 205.

The long distance wireless module 206 is a module configured to control long distance wireless communication including 3G, long term evolution (LTE) or other such 4G, wireless smart utility network (Wi-SUN) or other such low power wide area (LPWA), and 5G. The SIM card slot 207 is a slot into/from which a SIM card is freely inserted and removed. The SIM card is a memory card configured to store a unique number called "international mobile subscriber identity" (IMSI). The long distance wireless module 206 is allowed to perform communication under a state in which IMSI has been recognized. The long distance wireless IF 208 is an interface through which the long distance wireless module 206 transmits and receives data.

The short distance wireless module 209 is a module configured to control short distance wireless communication including Bluetooth® and Wi-Fi®. The short distance wireless IF 210 is an interface through which the short distance wireless module 209 transmits and receives data. The wired IF 211 is a connector to be coupled to a local area network (LAN) cable or a modular cable.

<Learning and Operation Performed by IoT Gateway 120>

Figure 3:
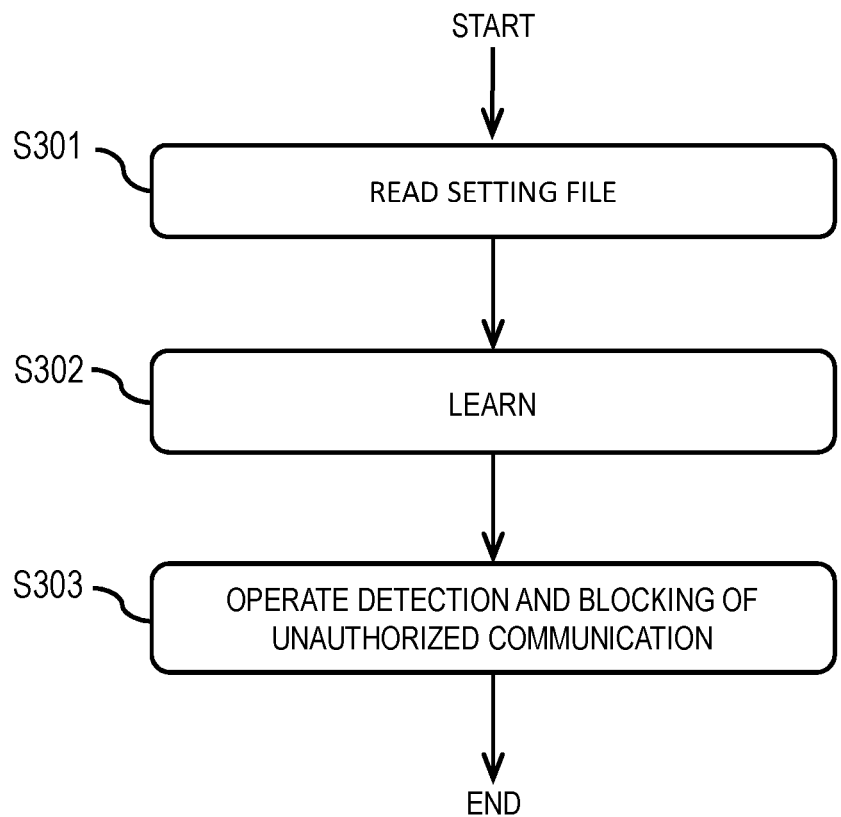
FIG. 3 is a flow chart for illustrating an example of a procedure for learning and operation processing performed by the IoT gateway.

FIG. 3 is a flow chart for illustrating an example of a procedure for learning and operation processing performed by the IoT gateway 120. When software for detecting and blocking unauthorized communication is to be introduced, setting files are created to be stored in the storage device 202, the setting files including a weight of each network feature amount, each of threshold values of detection and blocking, a fluctuation range of a learning model, and a score correction value. The IoT gateway 120 reads the setting files from the storage device 202 (Step S301).

Subsequently, during a learning period of normal communication, the IoT gateway 120 constructs a learning model by learning normal communication from a certain period of communication or a packet capture file corresponding to the certain period (Step S302). Then, during a period for operating the detection and blocking of unauthorized communication, the IoT gateway 120 compares the learning model with the network feature amount of the received packet, to thereby detect and block unauthorized communication (Step S303). In Step S303, the IoT gateway 120 also reflects, in the learning model, the packet regarded as normal even after the operation as the need arises.

<Example of Functional Configuration of IoT Gateway 120>

Figure 4:
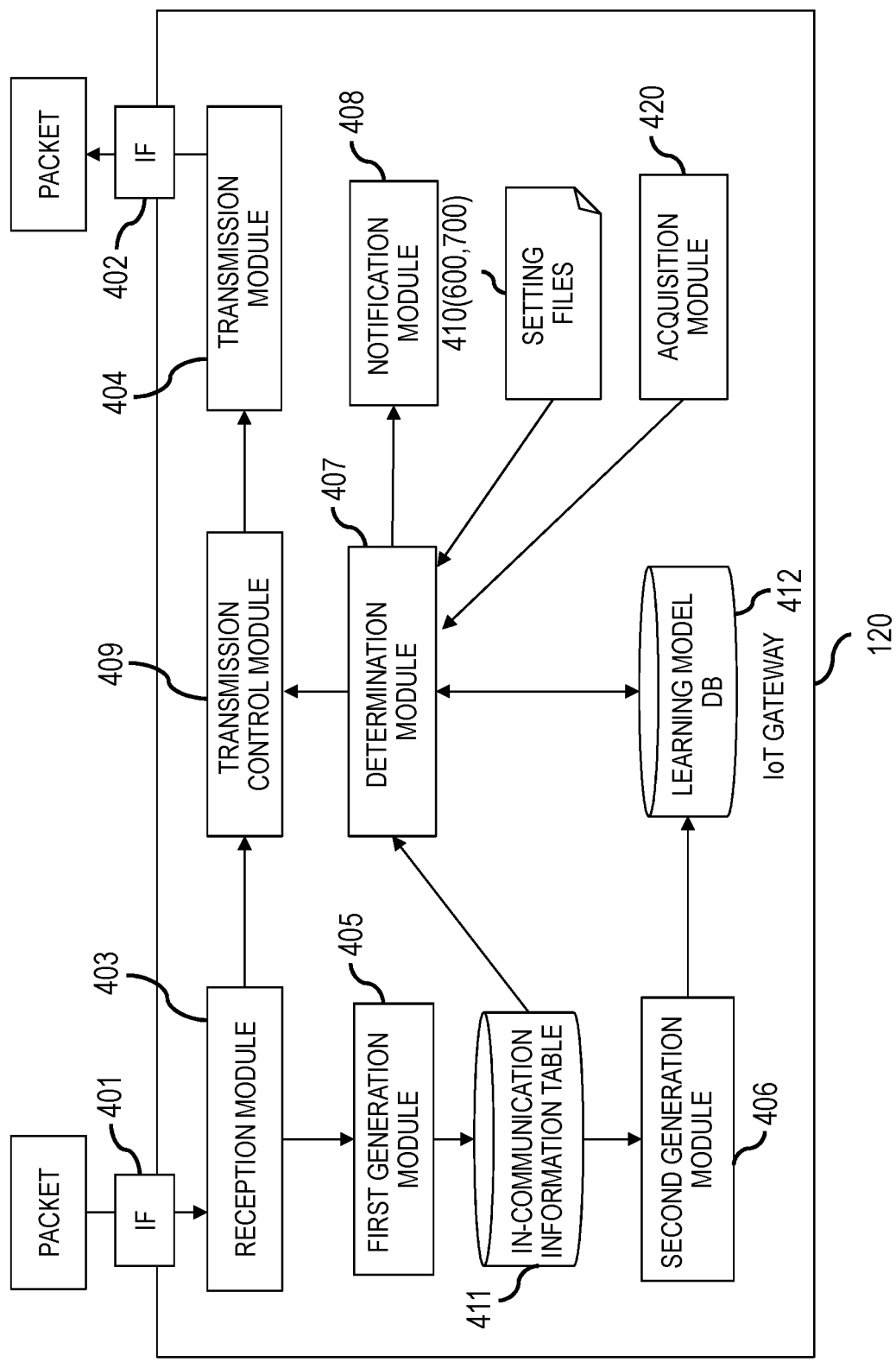
FIG. 4 is a block diagram for illustrating a functional configuration of the IoT gateway.

FIG. 4 is a block diagram for illustrating a functional configuration of the IoT gateway 120. The IoT gateway 120 includes a first IF 401, a second IF 402, a reception module 403, a first generation module 405, a second generation module 406, a determination module 407, a notification module 408, a transmission control module 409, a transmission module 404, setting files 410, an in-communication information table 411, and a learning model DB 412.

The first IF 401 is an interface through which packets are input from the server 111, the terminal 104, and the IoT device 121 to the inside of the IoT gateway 120. The first IF 401 is specifically implemented, for example, by the long distance wireless IF 208, the short distance wireless IF 210, or the wired IF 211 illustrated in FIG. 2.

The second IF 402 is an interface through which packets are output from the IoT gateway 120 to the server 111, the terminal 104, and the IoT device 121. The second IF 402 is specifically implemented, for example, by the long distance wireless IF 208, the short distance wireless IF 210, or the wired IF 211 illustrated in FIG. 2.

The packets input through the first IF 401 and the packets output from the second IF 402 have two types. One is packets to be used for the learning performed in Step S302 of FIG. 3, and the other is packets to be used for the operation. In the following description, the packet to be used for the learning is sometimes referred to as "learning packet", and the packet to be used for the operation is sometimes referred to as "operational packet". When the learning and the operation are not distinguished from each other, each of those packets is referred to simply as "packet".

The reception module 403 receives a packet from the first IF 401, and transfers the packet to the transmission control module 409. The reception module 403 also replicates the packet received from the first IF 401, and transfers the replicated packet to the first generation module 405. The reception module 403 is specifically implemented, for example, by controlling the processor 201 to execute a program stored in the storage device 202 or by the long distance wireless module 206 or the short distance wireless module 209.

The transmission module 404 transmits the packet transferred from the transmission control module 409 to a destination through the second IF 402. The reception module 403 is specifically implemented, for example, by controlling the processor 201 to execute a program stored in the storage device 202 or by the long distance wireless module 206 or the short distance wireless module 209.

The first generation module 405 generates in-communication information from the packet replicated by the reception module 403, and stores the in-communication information in the in-communication information table 411. The in-communication information is information relating to a cumulative feature amount during packet communication, and details of the in-communication information are described later with reference to FIG. 8.

The in-communication information is information relating to a cumulative feature amount during packet communication, details of which are described later with reference to FIG. 8. For each communication session, the first generation module 405 generates in-communication information through use of a network feature amount of a packet group during the communication session. The in-communication information generated through use of the learning packet is referred to as "second in-communication information piece", and the in-communication information generated through use of the operational packet is referred to as "first in-communication information piece". When the learning and the operation are not distinguished from each other, the in-communication information is referred to simply as "in-communication information". The first generation module 405 is specifically implemented, for example, by controlling the processor 201 to execute a program stored in the storage device 202.

The second generation module 406 refers to the in-communication information table 411 to generate a learning model relating to a network feature amount of a learning data group as a learning result, and stores the learning result in the learning model DB 412. The second generation module 406 is specifically implemented, for example, by controlling the processor 201 to execute a program stored in the storage device 202.

An acquisition module 420 acquires the score correction values (rp, rt) based on the fluctuation range of the learning model in the setting files 410 and the learning model in the learning model DB. The score correction value rp is assigned to the weight w8-3 of the first in-communication information piece C8-3 (cumulative packet size). The score correction value rt is assigned to the weight w11 of the first in-communication information piece C11 (communication time period). The score correction values (rp, rt) correspond to the fluctuation range of a learning model Ln that takes the influence of the wireless network 103 between the server 111 and the IoT gateway 120, which is the wireless environment, into consideration.

The acquisition module 420 is specifically implemented, for example, by causing the processor 201 to execute a program stored in the storage device 202.

The determination module 407 calculates a score of an operational packet by a determination expression for calculating the score for determining whether or not the operational packet is involved in unauthorized communication based on the learning model, and determines based on the calculated score whether or not the operational packet is involved in unauthorized communication. The determination expression is represented by Expression (1).

$$S(n) = w_1 x_1 + w_2 x_2 + \ldots + w_{8-2} x_{8-2} + r_p w_{8-3} x_{8-3} + \ldots + w_{10-2} x_{10-2} + r_t w_{11} x_{11} \quad (1)$$

In Expression (1), n represents an integer equal to or greater than 1. However, n may have a sub-number. Further, xn represents a true or false value obtained when an n-th learning model Ln and an n-th first in-communication information piece Cn are compared with each other. S(n) represents a score. In this embodiment, as the score S(n) becomes higher, a normal state is more likely to be determined, and hence a true value of xn is a value higher than a false value thereof. In this example, the true value is set to "1", and the false value is set to "0". Further, wn represents a weight set for the network feature amount. The weight wn is set based on the setting files 410.

The determination module 407 also applies the score S(n) calculated by the determination expression of Expression (1) to conditional expressions of Expressions (2) to (4), to thereby determine whether or not the operational packet being a calculation source of the score S(n) is involved in unauthorized communication.

$$\alpha \leq S(n) \quad (2)$$

$$\beta \leq S(n) < \alpha \quad (3)$$

$$S(n) < \beta \quad (4)$$

In Expressions (2) to (4), $\alpha$ represents a detection threshold value, and $\beta$ ($<\alpha$) represents a blocking threshold value. Expression (2) is a normal state determination conditional expression, Expression (3) is a detection determination conditional expression, and Expression (4) is a blocking determination conditional expression. In other words, Expression (2) indicates that the operational packet is involved in normal communication when the score S(n) is equal to or higher than $\alpha$. When the score S(n) is equal to or higher than $\beta$ and lower than $\alpha$, Expression (3) indicates that the operational packet is to be detected due to the high possibility of involvement in unauthorized communication. When the score S(n) is lower than $\beta$, Expression (4) indicates that the operational packet is involved in unauthorized communication and is therefore to be blocked.

The determination module 407 is specifically implemented, for example, by controlling the processor 201 to execute a program stored in the storage device 202.

When the determination module 407 determines detection or blocking, that is, when the score S(n) satisfies the detection determination conditional expression of Expression (3) or the blocking determination conditional expression of Expression (4), the notification module 408 notifies an external apparatus or a monitor (not shown) of the IoT gateway 120 to that effect. This notification allows a user to view the fact that unauthorized communication has occurred or there is a possibility of involvement therein. The notification module 408 is specifically implemented, for example, by controlling the processor 201 to execute a program stored in the storage device 202.

The transmission control module 409 controls the transmission of the operational packet performed by the transmission module 404 based on the determination result obtained by the determination module 407. Specifically, for example, when the score S(n) satisfies the blocking determination conditional expression of Expression (4), the transmission control module 409 discards the operational packet without transferring the operational packet to the transmission module 404. With this configuration, unauthorized transmission of the operational packet is blocked by the IoT gateway 120. When the score S(n) satisfies the normal state determination conditional expression of Expression (2) or the detection determination conditional expression of Expression (3), the transmission control module 409 transfers the operational packet to the transmission module 404. The transmission control module 409 is specifically implemented, for example, by controlling the processor 201 to execute a program stored in the storage device 202.

The setting files 410 are files for defining the weight wn corresponding to the network feature amount, the detection threshold value α, the blocking threshold value β (<α), the normal state determination conditional expression of Expression (2), the detection determination conditional expression of Expression (3), and the blocking determination conditional expression of Expression (4), and are read by the determination module 407.

<Network Feature Amount>

Figure 5:
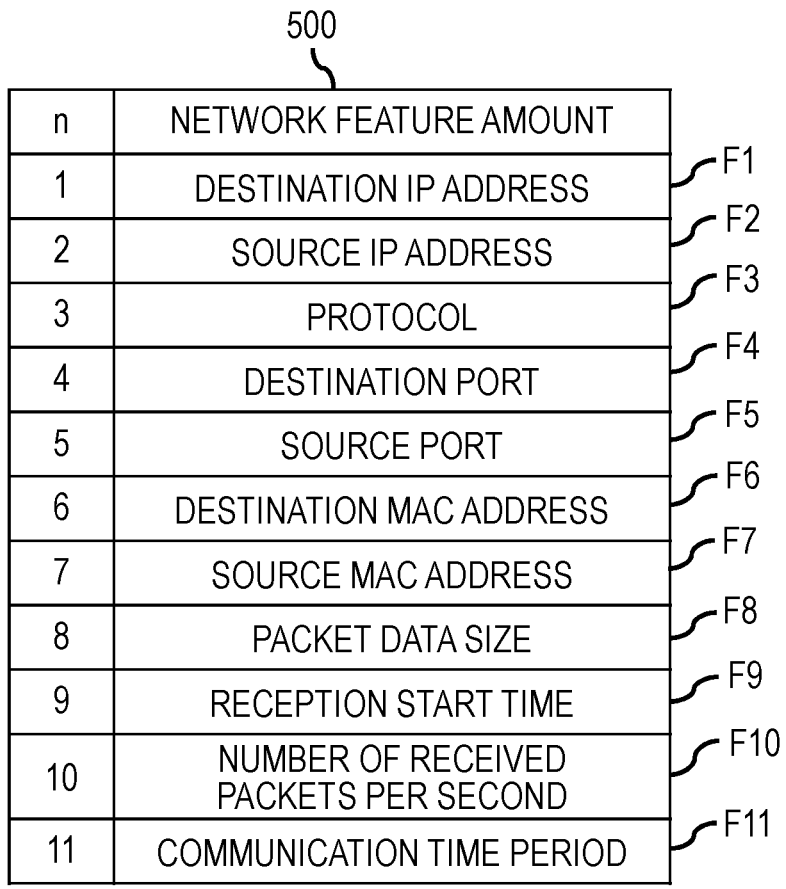
FIG. 5 is an explanatory diagram for illustrating a network feature amount.

FIG. 5 is an explanatory diagram for illustrating a network feature amount. A network feature amount Fn is a feature amount extracted by the first generation module 405 from the packet replicated by the reception module 403. In this example, eleven network feature amounts Fn are extracted as illustrated in, for example, FIG. 5.

Network feature amounts F1 to F8 with item numbers n of from 1 to 8 are feature amounts acquired from the packet itself. Network feature amounts F9 to F11 with item numbers n of from 9 to 11 are feature amounts calculated for each communication session. A reception start time being the network feature amount F9 is a time at which the communication session started, and is set to have a recording interval of, for example, every hour, which is not required to be as fine as every second. For example, when the first packet is received at 9:05 during a given communication session, the reception start time is simply set as "9 hour". It should be noted that a time at which a packet was first received in the communication session is used for the calculation of the network feature amount F10, and hence the first generation module 405 holds the time as, for example, "9 hour 5 minute 37 second" in units of seconds.

A number of received packets per second (pps) being the network feature amount F10 is the number of packets received in each second during the communication session. A communication time period being the network feature amount F11 is a time period (millisecond) from the start to the end of the communication session. For example, when the communication session starts at "9 hour 5 minute 37 second" and ends at "9 hour 8 minute 43 second", the communication time period is set as "186 seconds".

<Setting Files 410>

FIG. 6 is an explanatory diagram for illustrating an example of a first setting file. A first setting file 600 includes the weight wn for each network feature amount Fn. The value of the weight wn can be freely set by the user. Therefore, in a case of the IoT system 100 in which a new IoT device 121 may be added thereto or communication traffic may be changed, detailed settings can be made for each network feature amount Fn by, for example, allowing a change in source IP address. When the item number n of the true or false value xn includes a sub-number in the determination expression of Expression (1), the same weight wn is used for each sub-number. For example, when the item number n is "8-3", the value of the weight wn is applied to the values of the weights w8-1, w8-2, and w8-3. Specifically, for example, the first setting file 600 is stored in the flash memory 222, and is read into the determination module 407.

FIG. 7 is an explanatory diagram for illustrating an example of a second setting file. A second setting file 700 is a file obtained by associating a determination result 701 with a threshold value 702. A threshold value 702 for a determination result 701 being "normal" is "80 or greater", and this entry corresponds to the normal state determination conditional expression of Expression (2). The threshold value 702 for the determination result 701 being "detect" is "20 to 79", and this entry corresponds to the detection determination conditional expression of Expression (3). The threshold value 702 for the determination result 701 being "block" is "less than 20", and this entry corresponds to the blocking determination conditional expression of Expression (4).

The detection threshold value α and the blocking threshold value β (<α) can be freely set by the user. Therefore, in the case of the IoT system 100 in which a new IoT device 121 may be added thereto or communication traffic may be changed, detailed settings can be made for each network feature amount Fn by, for example, allowing a change in source IP address. Specifically, for example, the second setting file 700 is stored in the flash memory 222, and is read into the determination module 407.

Figures 15, 16:
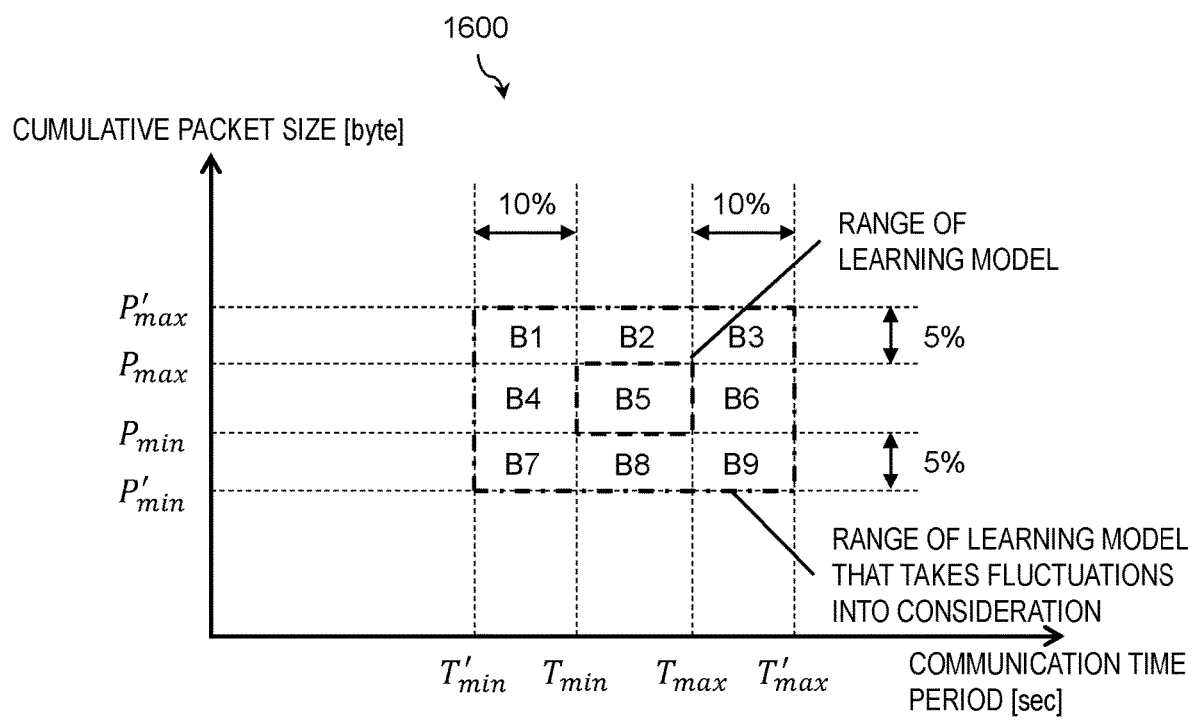
FIG. 15 is an explanatory diagram for illustrating an example of a third setting file.
FIG. 16 is a graph for showing a range of the fluctuations based on the third setting file illustrated in FIG. 15.

FIG. 15 is an explanatory diagram for illustrating an example of a third setting file. In the unauthorized communication determination processing performed by the determination module 407, a third setting file 1500 defines a range of allowing fluctuations in the value of the learning model in order to perform the determination by taking into consideration the fluctuations of specific in-communication information pieces (cumulative packet size C8-3 and communication time period C11, which are described later with reference to FIG. 8) due to the influence of the wireless environment. Specifically, for example, the third setting file 1500 is a file obtained by associating a learning model 1501 that takes the fluctuations into consideration and a fluctuation degree 1502. The values L8-3, L8-4, L11-1, and L11-2 of the learning model 1501 that takes the fluctuations into consideration are items set from FIG. 9, which is described later. The values "+5%", "−5%", "+10%", and "−10%" of the fluctuation degree 1502 are examples of values set in advance, and may be other values.

FIG. 16 is a graph for showing a range of the fluctuations based on the third setting file 1500 illustrated in FIG. 15. In the graph 1600, the vertical axis indicates the cumulative packet size, and the horizontal axis indicates the communication time period. In the vertical axis, Pmax represents a value of the cumulative maximum packet size L8-3 at a time of learning. P'max represents the upper limit value of a cumulative maximum packet size, and is a value obtained by changing the value of the cumulative maximum packet size L8-3 by +5% (multiplying the value by 1.05). The value "+5%" is a value of the fluctuation degree 1502 corresponding to the cumulative maximum packet size L8-3 in the third setting file 1500.

Pmin represents a value of the cumulative minimum packet size L8-4 at the time of learning. P'min represents a value of the lower limit value of a cumulative minimum packet size, and is a value obtained by changing the value of the cumulative minimum packet size L8-4 by −5% (multiplying the value by 0.95). The value "−5%" is a value of the fluctuation degree 1502 corresponding to the cumulative minimum packet size L8-4 in the third setting file 1500.

In the horizontal axis, Tmax represents a value of the maximum communication time period L11-1 at the time of learning. T'max represents a value of the upper limit value of a maximum communication time period, and is a value obtained by changing the value of the maximum communication time period L11-1 by +10% (multiplying the value by 1.10). The value "+10%" is a value of the fluctuation degree 1502 corresponding to the maximum communication time period L11-1 in the third setting file 1500.

Tmin represents a value of the minimum communication time period L11-2 at the time of learning. T'min represents a value of the lower limit value of a minimum communication time period, and is a value obtained by changing the value of the minimum communication time period L11-2 by −10% (multiplying the value by 0.90). The value "−10%" is a value of the fluctuation degree 1502 corresponding to the minimum communication time period L11-2 in the third setting file 1500.

Areas obtained by dividing an area into nine by Pmax, P'max, Pmin, P'min, Tmax, T'max, Tmin, and T'min are referred to as "blocks B1 to B9". The block B5 is a range of the learning models L8-3, L8-4, L11-1, and L11-2 exhibited when the third setting file 1500 is not taken into consideration. Specifically, for example, the third setting file 1500 is stored in the flash memory 222, and is read into the determination module 407.

FIG. 17 is an explanatory diagram for illustrating an example of a fourth setting file. A fourth setting file 1700 holds the score correction values (rp, rt) identified by the value P8-3 of the cumulative packet size C8-3 and the value T11 of the communication time period C11 among the first in-communication information pieces Cn illustrated in FIG. 8, which are described later, for each of the blocks B1 to B9. Specifically, for example, the fourth setting file 1700 is stored in the flash memory 222, and is read into the determination module 407.

<In-Communication Information Table 411>

Figure 8:
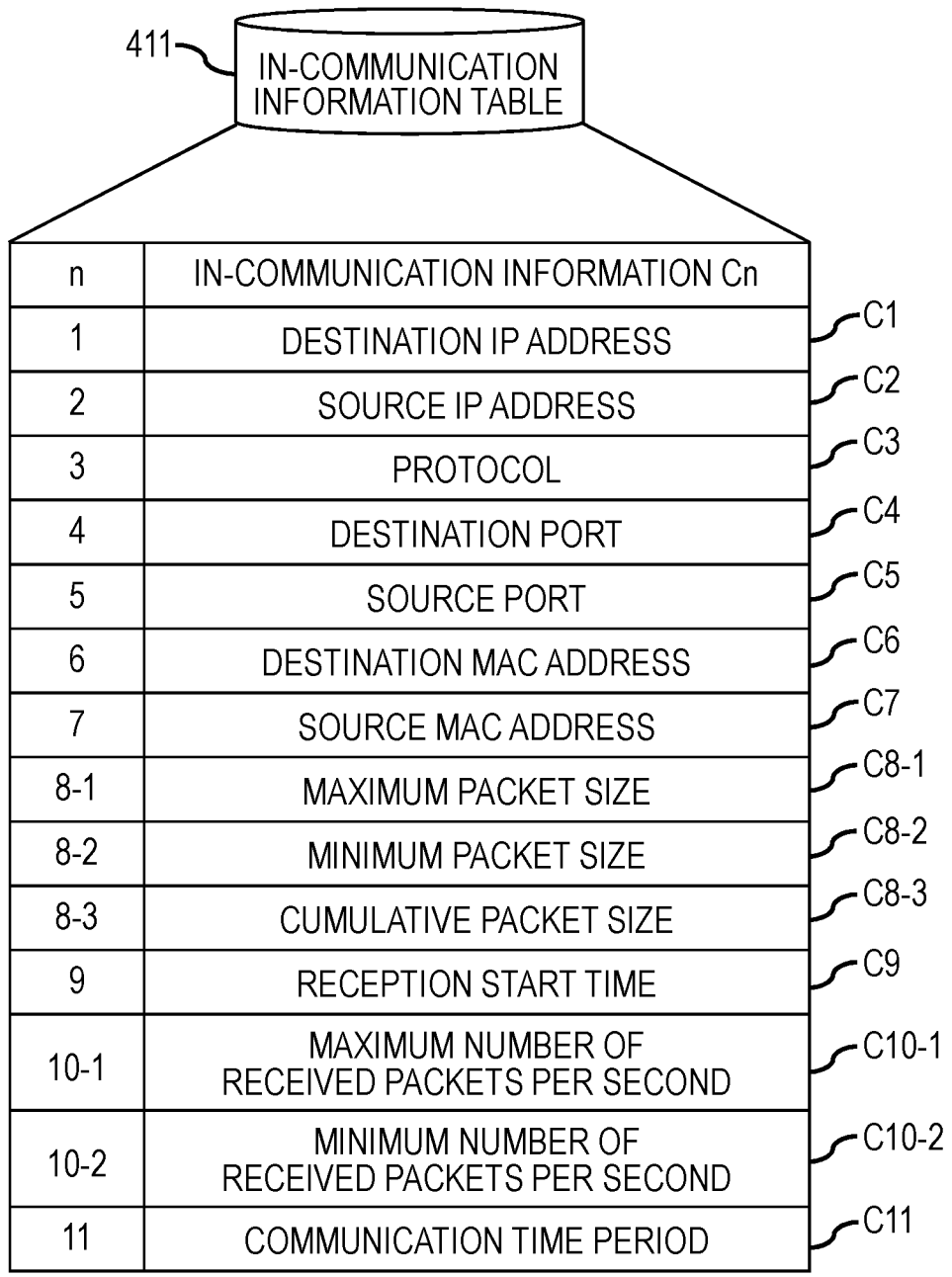
FIG. 8 is an explanatory diagram for illustrating an example of a data structure of the in-communication information table.

FIG. 8 is an explanatory diagram for illustrating an example of a data structure of the in-communication information table 411. The in-communication information table 411 is a table for storing the in-communication information. Specifically, for example, the in-communication information table 411 is stored in the flash memory 222. The in-communication information table 411 is generated by the first generation module 405 for each communication session irrespective of which of learning and operation the communication session relates to.

The in-communication information piece Cn corresponds to the network feature amount Fn. However, the in-communication information piece Cn defines the network feature amount Fn in more detail, and hence a plurality of in-communication information pieces Cn may be defined for one network feature amount Fn. In this case, a distinction is made by adding a sub-number at the end of each of the in-communication information pieces Cn.

In-communication information pieces C1 to C7 are extracted from a header of a received packet. When a value different from a value of each of the already extracted in-communication information pieces C1 to C7 is extracted during the same communication session, the extracted value is added thereto. For example, when a destination IP address of "10.10.10.1" is extracted from a given packet during a given communication session, "10.10.10.1" is held as the in-communication information piece C1. After that, when the destination IP address of the subsequent packet received during the same communication session is "10.10.10.2", "10.10.10.2" is also held as the in-communication information piece C1.

An in-communication information piece C8-1 (maximum packet size), an in-communication information piece C8-2 (minimum packet size), and an in-communication information piece C8-3 (cumulative packet size) are generated from the network feature amount F8 (packet data size).

The in-communication information piece C8-1 (maximum packet size) is the maximum packet size in a packet group obtained from the start of reception of packets until the current time point in the communication session. Therefore, every time the packet is received, the maximum packet size at the current time point and a packet size of the currently received packet are compared with each other, and when the maximum packet size is exceeded, the in-communication information piece C8-1 (maximum packet size) is updated to the packet size of the currently received packet in real time.

The in-communication information piece C8-2 (minimum packet size) is the minimum packet size in a packet group obtained from the start of reception of packets until the current time point in the communication session. Therefore, every time the packet is received, the minimum packet size at the current time point and a packet size of the currently received packet are compared with each other, and when the packet size of the currently received packet falls below the minimum packet size at the current time point, the in-communication information piece C8-2 (minimum packet size) is updated to the packet size of the currently received packet in real time.

The in-communication information piece C8-3 (cumulative packet size) is a packet size at the current time point, which is obtained by accumulating packet sizes of the packet group obtained from the start of reception of packets until the current time point in the communication session. Therefore, every time the packet is received, the in-communication information piece C8-3 (cumulative packet size) is updated in real time.

In the same manner as the network feature amount F9, the reception start time being the in-communication information piece C9 is a time at which the communication session started, and is set to have a recording interval of, for example, every hour, which is not required to be as fine as every second. For example, when the first packet is received at 9:05 during a given communication session, the reception start time is simply set as "9 hour".

An in-communication information piece C10-1 (maximum number of received packets per second) and an in-communication information piece C10-2 (minimum number of received packets per second) are generated from the number of received packets per second (pps) being the network feature amount F10.

The in-communication information piece C10-1 (maximum number of received packets per second) is the maximum value of the number of packets per second measured for each second of a period from the start of reception of packets until the current time point in the communication session. Therefore, every time the time progresses in units of seconds during the communication session, the maximum number of received packets per second at the current time point and the current number of received packets per second are compared with each other, and when the maximum number of received packets per second is exceeded, the in-communication information piece C10-1 (maximum number of received packets per second) is updated to the current number of received packets per second in real time.

The in-communication information piece C10-2 (minimum number of received packets per second) is the minimum value of the number of packets per second measured for each second of a period from the start of reception of packets until the current time point in the communication session. Therefore, every time the time progresses in units of seconds during the communication session, the minimum number of received packets per second at the current time point and the current number of received packets per second are compared with each other, and when the current number of received packets per second falls below the minimum number of received packets per second, the in-communication information piece C10-2 (minimum number of received packets per second) is updated to the current number of received packets per second in real time.

In the same manner as the network feature amount F11, the communication time period being an in-communication information piece C11 is a time period (millisecond) from the start to the end of the communication session. For example, when the communication session starts at "9 hour 5 minute 37 second" and ends at "9 hour 8 minute 43 second", the communication time period is set as "186 seconds".

<Learning Model DB 412>

Figure 9:
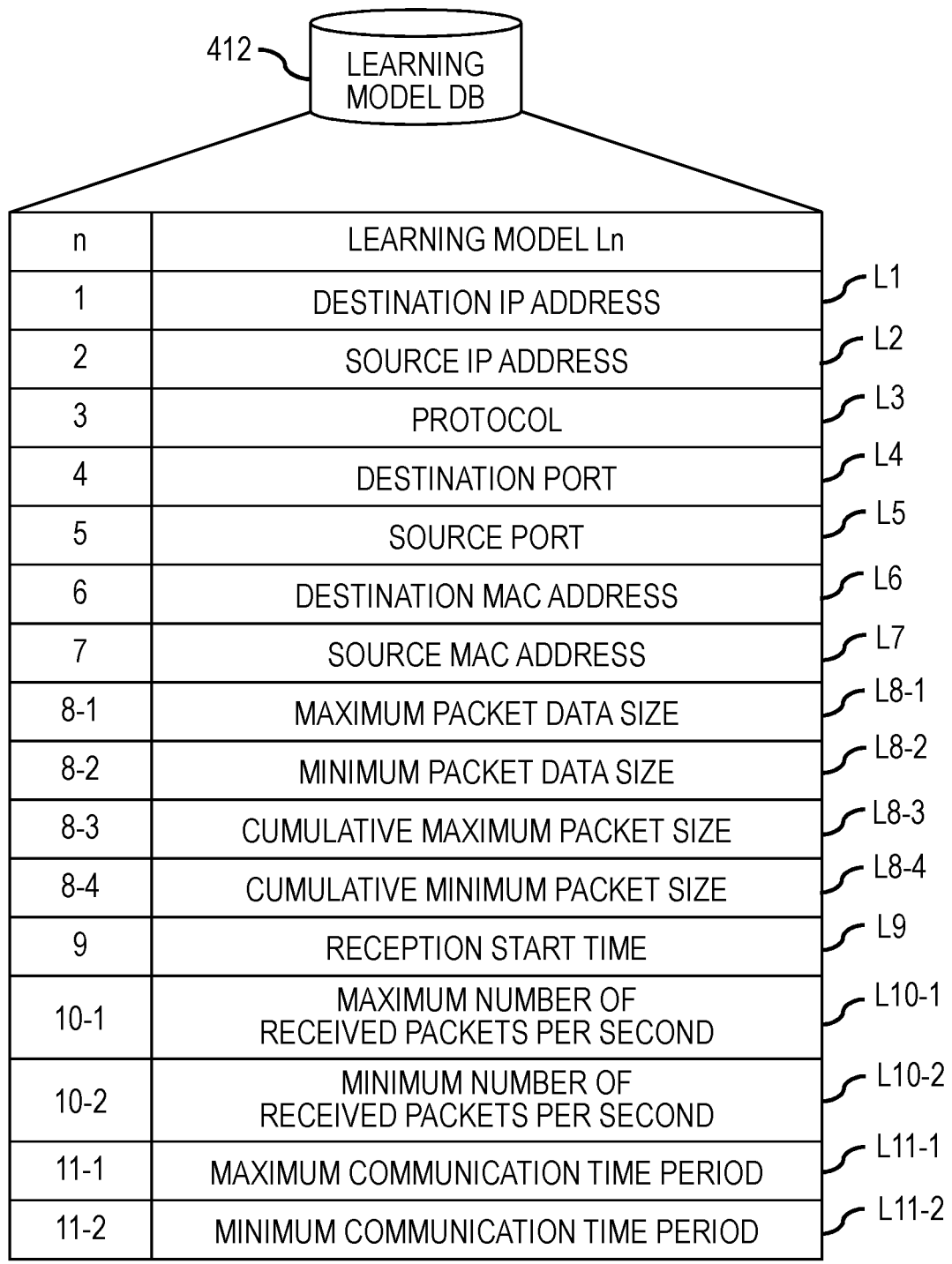
FIG. 9 is an explanatory diagram for illustrating an example of a data structure of the learning model DB.

FIG. 9 is an explanatory diagram for illustrating an example of a data structure of the learning model DB 412, and FIG. 10 is an explanatory diagram for illustrating an example of the learning model Ln. The learning model DB 412 is a database obtained by listing learning models L1 to L11-2 corresponding to the network feature amounts F1 to F11. The learning model DB 412 is generated by the second generation module 406 from the in-communication information pieces Cn generated during the learning period, that is, from all the communication sessions during the learning period. Specifically, for example, the learning model DB 412 is stored in the flash memory 222.

The learning model Ln corresponds to the network feature amount Fn. However, in the same manner as the in-communication information piece Cn, the learning model Ln defines the network feature amount Fn in more detail, and hence a plurality of pieces of learning models Ln may be defined for one network feature amount Fn. In this case, a distinction is made by adding a sub-number at the end of each of the learning models Ln.

The learning models L1 to L7 are generated as unions of the in-communication information pieces C1 to C7 for each communication session generated during the learning period, respectively. For example, when the destination IP address being the in-communication information piece C1 for a given communication session is "10.10.10.1" and the destination IP address being the in-communication information piece C1 for another communication session during the same learning period is "10.10.10.2", the learning model L1 is "10.10.10.1" and "10.10.10.2".

The learning model L8-1 (maximum packet size), the learning model L8-2 (minimum packet size), the learning model L8-3 (cumulative maximum packet size), and the learning model L8-4 (cumulative minimum packet size) are generated from the in-communication information pieces C8-1 to C8-3.

The learning model L8-1 (maximum packet size) is the maximum value among the values of the maximum packet sizes being the in-communication information pieces C8-1 for the respective communication sessions during the learning period. The learning model L8-2 (minimum packet size) is the minimum value among the values of the minimum packet sizes being the in-communication information pieces C8-2 for the respective communication sessions during the learning period. The learning model L8-3 (cumulative maximum packet size) is the maximum value among the values of the cumulative packet sizes being the in-communication information pieces C8-3 for the respective communication sessions during the learning period. The learning model L8-4 (cumulative minimum packet size) is the minimum value among the values of the cumulative packet sizes being the in-communication information pieces C8-3 for the respective communication sessions during the learning period.

The learning model L9 (reception start time) is the earliest reception start time among the reception start times being the in-communication information pieces C9 for the respective communication sessions during the learning period. For example, when the first packet is received at 9:50 during a given communication session and the communication session continues until 10:10, the learning model L9 (reception start time) is 9:00.

The learning model L10-1 (maximum number of received packets per second) is the maximum value among the values of the maximum number of received packets per second being the in-communication information pieces C10-1 for the respective communication sessions during the learning period. The learning model L10-2 (minimum number of received packets per second) is the minimum value among the values of the minimum number of received packets per second being the in-communication information pieces C10-2 for the respective communication sessions during the learning period.

The learning model L11-1 (maximum communication time period) and the learning model L10-2 (minimum communication time period) are generated from the in-communication information piece C11. The learning model L 11-1 (maximum communication time period) is the maximum value among the values of the communication time period being the in-communication information pieces C11 for the respective communication sessions during the learning period. The learning model L11-2 (minimum communication time period) is the minimum value among the values of the communication time period being the in-communication information pieces C11 for the respective communication sessions during the learning period.

<Example of Comparison Between Learning Model Ln and First In-Communication Information Piece Cn>

Figure 11:
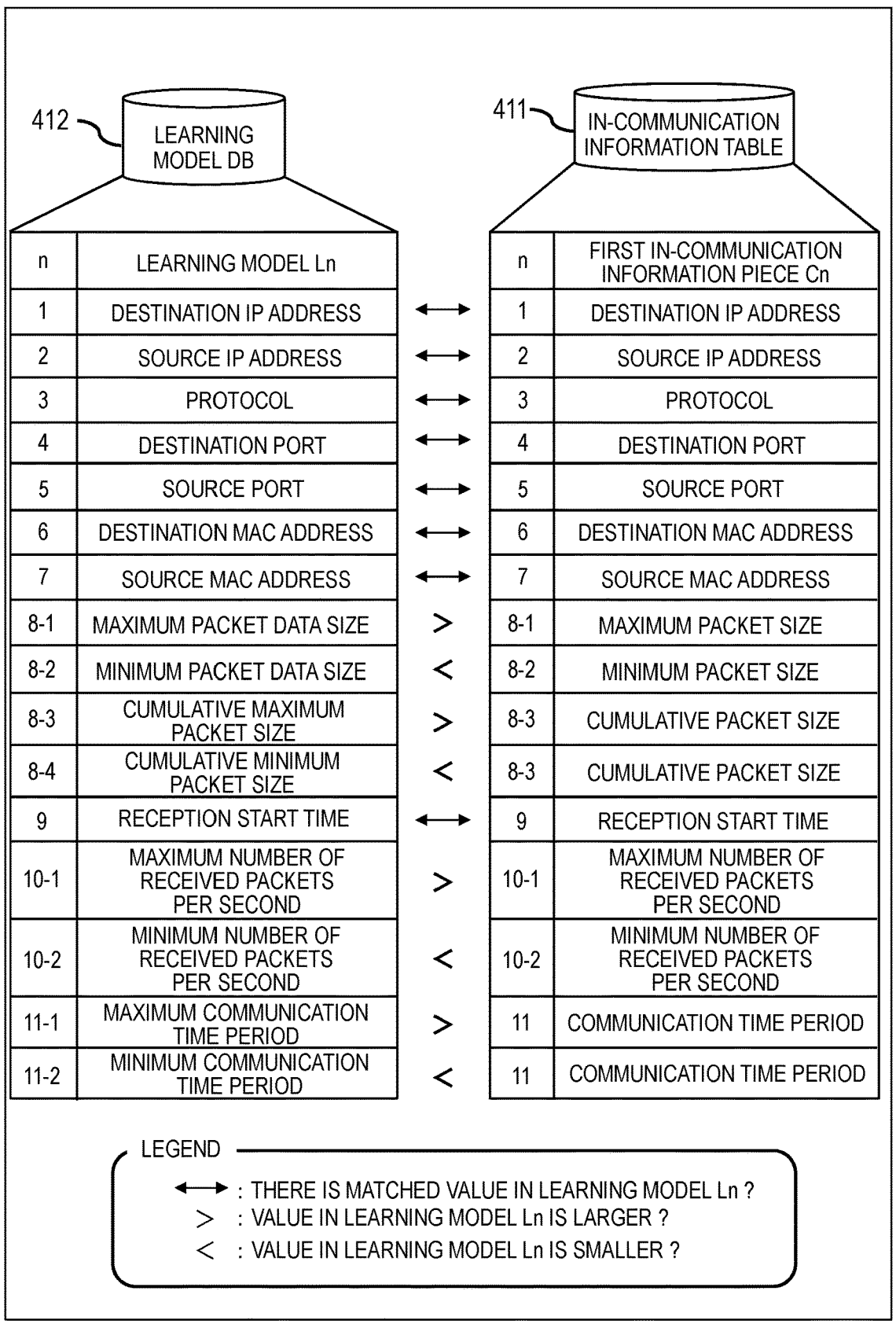
FIG. 11 is an explanatory diagram for illustrating an example of comparison conditions between the learning model in the determination module and the first in-communication information piece generated from the operational packet.

FIG. 11 is an explanatory diagram for illustrating an example of comparison conditions between the learning model Ln in the determination module 407 and the first in-communication information piece Cn generated from the operational packet. The determination module 407 determines whether or not there is a matching value in the corresponding learning models L1 to L7 and L9 for each of the first in-communication information pieces C1 to C7 and C9. Specifically, for example, when the learning model L1 (destination IP address) has values of "10.10.10.1" and "10.10.10.2" and the first in-communication information piece C1 (destination IP address) has a value of "10.10.10.1", the determination module 407 determines that there is a matching value of "10.10.10.1" in the learning model L1.

The determination module 407 also determines whether or not the values of the models L8-1, L8-3, L10-1, and L11-1 are greater than the values of the corresponding first in-communication information pieces C8-1, C8-3, C10-1, and C11, respectively. Specifically, for example, when the learning model L8-1 (maximum packet data size) has a value of "1500 (bytes)" and the first in-communication information piece C8-1 (maximum packet data size) has a value of "1400 (bytes)", the determination module 407 determines that the value "1500 (bytes)" of the learning model L8-1 (maximum packet data size) is greater than the value "1400 (bytes)" of the first in-communication information piece C8-1 (maximum packet data size).

The determination module 407 also determines whether or not the values of the models L8-2, L8-4, L10-2, and L11-2 are smaller than the values of the corresponding first in-communication information pieces C8-2, C8-4, C10-2, and C11, respectively. Specifically, for example, when the learning model L8-2 (maximum packet data size) has a value of "60 (bytes)" and the first in-communication information piece C8-2 (maximum packet data size) has a value of "70 (bytes)", the determination module 407 determines that the value "60 (bytes)" of the learning model L8-2 (minimum packet data size) is smaller than the value "70 (bytes)" of the first in-communication information piece C8-2 (minimum packet data size).

Regarding the satisfied comparison conditions, as a result of comparing the learning model Ln and the first in-communication information piece Cn, the determination module 407 sets the value of the true or false value xn of the determination expression of Expression (1) to xn=1 when the comparison conditions are satisfied, and sets the value of the true or false value xn of the determination expression of Expression (1) to xn=0 for a comparison condition that is not satisfied.

<Example of Packet Processing Sequence at Time of Learning>

Figure 12:
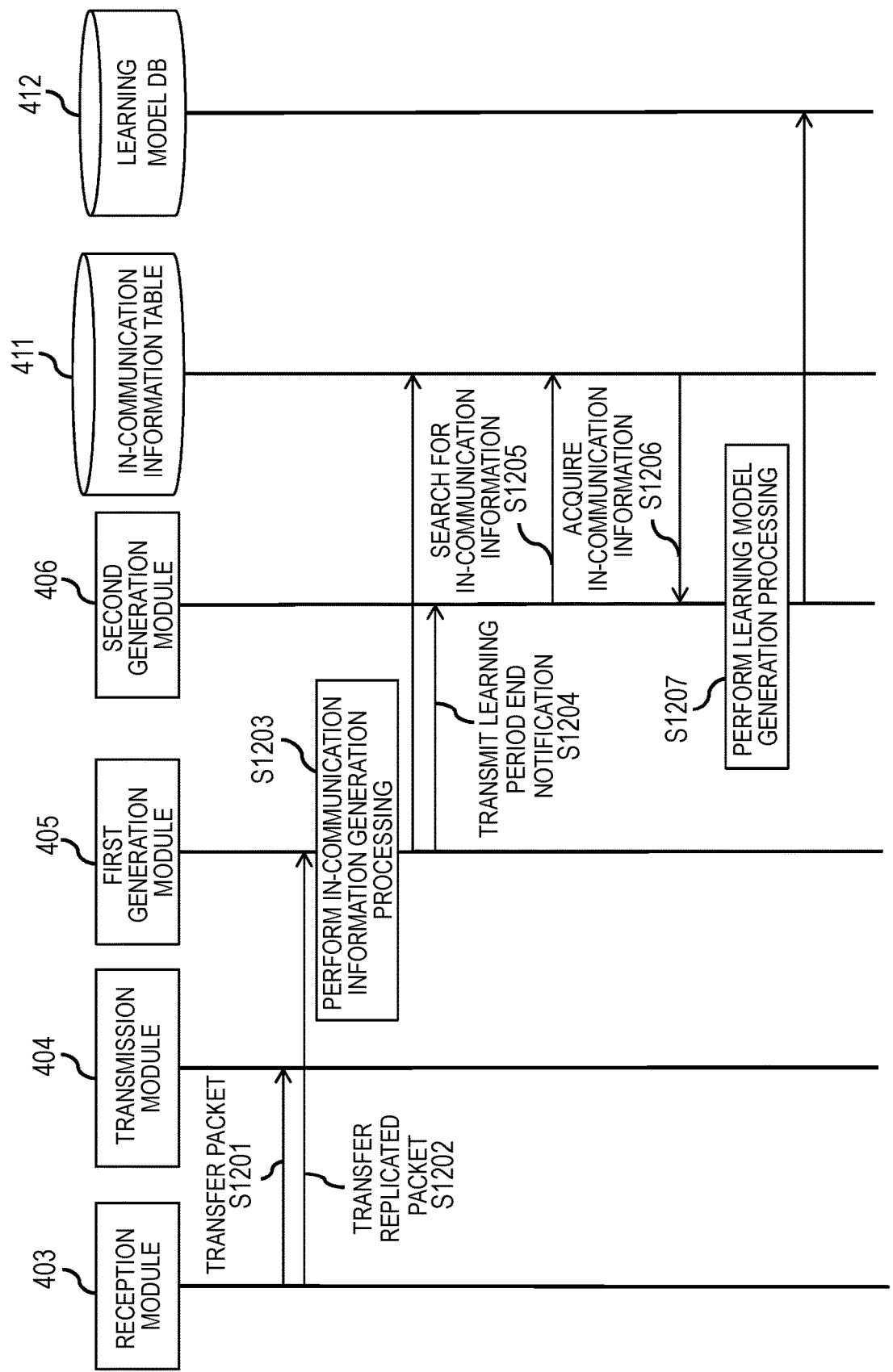
FIG. 12 is a sequence diagram for illustrating an example of a packet processing sequence at a time of learning, which is performed by the IoT gateway.

FIG. 12 is a sequence diagram for illustrating an example of a packet processing sequence at a time of learning, which is performed by the IoT gateway 120. It is assumed that the learning period is set in advance for the first generation module 405. When receiving a packet from the first IF 401 during the learning period, the reception module 403 transfers the received packet to the transmission module 404 via the transmission control module 409 (Step S1201). With this transfer, the transmission module 404 can transmit the packet to the destination via the second IF 402. The reception module 403 also replicates the received packet, and transfers the replicated packet to the first generation module 405 (Step S1202).

When receiving the replicated packet, the first generation module 405 generates a second in-communication information piece for each communication session, and stores the second in-communication information piece in the in-communication information table 411 (Step S1203). When detecting that the learning period set in advance has ended, the first generation module 405 transmits the learning period end notification to the second generation module 406 (Step S1204).

When receiving the learning period end notification, the second generation module 406 searches the in-communication information table 411 for the second in-communication information piece during the learning period, which is to be learned (Step S1205), and acquires the hit second in-communication information piece (Step S1206). Then, the second generation module 406 uses the acquired second in-communication information piece to generate the learning model Ln (Step S2107). After this, the IoT gateway 120 brings the learning processing for a given learning period to an end.

Figure 13:
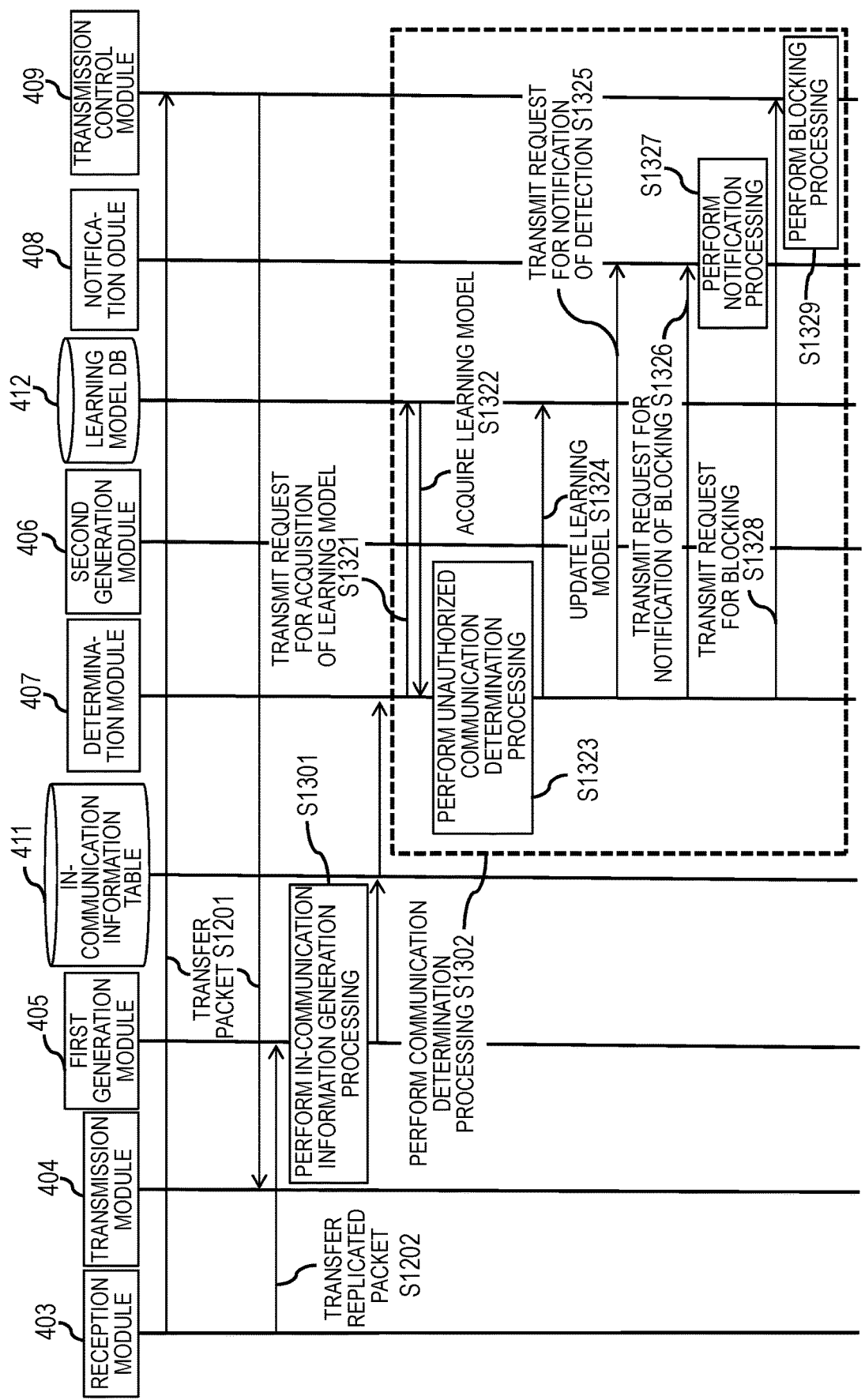
FIG. 13 is a sequence diagram for illustrating an example of a packet processing sequence at a time of operation, which is performed by the IoT gateway.

FIG. 13 is a sequence diagram for illustrating an example of a packet processing sequence at a time of operation, which is performed by the IoT gateway 120. When receiving a packet from the first IF 401 during the operation period, the reception module 403 transfers the received packet to the transmission module 404 via the transmission control module 409 (Step S1201). With this transfer, the transmission module 404 can transmit the packet to the destination via the second IF 402. The reception module 403 also replicates the received packet, and transfers the replicated packet to the first generation module 405 (Step S1202). Every time the replicated packet is received, the first generation module 405 generates or updates a first in-communication information piece, and stores the first in-communication information piece in the in-communication information table 411 (Step S1301).

Every time a packet is transferred from the reception module 403 to the transmission control module 409, that is, every time a first in-communication information piece is generated or updated, the determination module 407 executes communication determination processing (Step S1302). In the communication determination processing (Step S1302), at a time of start of the communication determination processing (Step S1302), the determination module 407 transmits a request for acquisition of the learning model Ln to the learning model DB 412 (Step S1321), and acquires the learning model Ln from the learning model DB 412 (Step S1322). Step S1321 and Step S1322 are required to be executed only at the time of the start of the communication session, and are not executed after the time of the start.

The determination module 407 executes unauthorized communication determination processing (Step S1323). The unauthorized communication determination processing (Step S1323) is processing for comparing the learning model Ln and the latest first in-communication information piece and calculating the determination expression of Expression (1), to thereby determine which one of a packet involved in normal communication, a packet possibly involved in unauthorized communication, and a packet involved in unauthorized communication the currently received packet is. Detailed processing of the unauthorized communication determination processing (Step S1323) corresponds to Step S1401 to Step S1404 described later with reference to FIG. 14.

When it is determined that the currently received packet is the packet involved in normal communication in the unauthorized communication determination processing (Step S1323), the packet is transferred to the transmission module 404 without being blocked by the transmission control module 409. The determination module 407 also updates the learning model Ln based on the latest first in-communication information piece (Step S1324). The learning model Ln to be updated is the learning model Ln that does not match the first in-communication information piece Cn. For example, when the learning models L1 to L7 and L9 have not been satisfied, the first in-communication information pieces C1 to C7 and C9 that have been subjected to the comparison are added to the learning models L1 to L7 and L9.

For example, when the learning model L1 (destination IP address) has values of "10.10.10.1" and "10.10.10.2" and the first in-communication information piece C1 (destination IP address) has a value of "10.10.10.3", the determination module 407 adds the mismatching value "10.10.10.3" of the first in-communication information piece C1 (destination IP address) to the learning model L1 (destination IP address). With this addition, the updated learning model L1 (destination IP address) has values of "10.10.10.1", "10.10.10.2", and "10.10.10.3".

Meanwhile, when the learning models L8-1 to L8-4 and L10-1 to L11-2 have not been satisfied, the models L8-1 to L8-4 and L10-1 to L11-2 are overwritten with the first in-communication information pieces C8-1 to L8-3 and C10-1 to C11 that have been subjected to the comparison.

For example, when the learning model L8-1 (maximum packet data size) has a value of "1500 (bytes)" and the first in-communication information piece C8-1 (maximum packet data size) has a value of "1600 (bytes)", the determination module 407 overwrites the value "1500 (bytes)" of the learning model L8-1 (maximum packet data size) with the value "1600 (bytes)" of the first in-communication information piece C8-1 (maximum packet data size) that has not satisfied the learning model L8-1. With this overwriting, the updated learning model L8-1 (maximum packet data size) has a value of "1600 (bytes)".

When it is determined that the currently received packet is the packet possibly involved in unauthorized communication in the unauthorized communication determination processing (Step S1323), the packet is transferred to the transmission module 404 without being blocked by the transmission control module 409. Further, the determination module 407 determines that the possibility of involvement in unauthorized communication has been detected, and transmits a request for notification of the detection of the possibility of the involvement in unauthorized communication to the notification module 408 (Step S1325). When receiving the request for notification of the detection, the notification module 408 gives a notification to that effect (Step S1327). The notification includes, for example, five tuples (destination IP address (F1), source IP address (F2), protocol (F3), destination MAC address (F6), and source MAC address (F7)) that can specify the packet and a reception time. The destination MAC address (F6) and the source MAC address (F7) may be replaced by a destination port (F4) and a source port (F5). This notification allows the user to examine which packet is possibly involved in unauthorized communication and was received at which time point.

When it is determined that the currently received packet is the packet involved in unauthorized communication in the unauthorized communication determination processing (Step S1323), the determination module 407 transmits a request for notification of the blocking of the packet to the notification module 408 (Step S1326). When receiving the request for notification of the blocking, the notification module 408 gives a notification to that effect (Step S1327). The notification includes, for example, five tuples (destination IP address (F1), source IP address (F2), protocol (F3), destination MAC address (F6), and source MAC address (F7)) that can specify the packet and a reception time. The destination MAC address (F6) and the source MAC address (F7) may be replaced by a destination port (F4) and a source port (F5). This notification allows the user to examine which packet is possibly involved in unauthorized communication and was received at which time point.

In addition, the determination module 407 transmits a request for blocking the packet to the transmission control module 409 (Step S1328). The request for blocking includes the network feature amount Fn of the packet. Examples of the network feature amount Fn included in the request for blocking include five tuples (destination IP address (F1), source IP address (F2), protocol (F3), destination MAC address (F6), and source MAC address (F7)) that can specify the packet and the reception time. The destination MAC address (F6) and the source MAC address (F7) may be replaced by the destination port (F4) and the source port (F5). The network feature amount Fn included in the request for blocking is referred to as "blocking feature amount Fs".

When receiving the request for blocking, the transmission control module 409 holds the blocking feature amount Fs, and every time a packet is transferred from the reception module 403 after the time of reception of the request for blocking, blocks a packet corresponding to the blocking feature amount Fs, that is, discards the packet without transferring the packet to the transmission module 404 (Step S1329). The unauthorized communication determination processing (Step S1323) and blocking processing (Step S1329) are performed asynchronously, and hence the packet received from the reception module 403 is transferred to the transmission module 404 unless the packet corresponds to the blocking feature amount Fs. Therefore, efficiency of packet transfer can be achieved.

In addition, when receiving the request for blocking, the transmission control module 409 holds the blocking feature amount Fs, to thereby discard the packet corresponding to the blocking feature amount Fs in the subsequent packet group without waiting for the determination result of the involvement in unauthorized communication, which is obtained in the unauthorized communication determination processing (Step S1323). Therefore, efficiency of the blocking processing (Step S1329) can be increased.

<Communication Determination Processing (Step S1302)>

Figure 14:
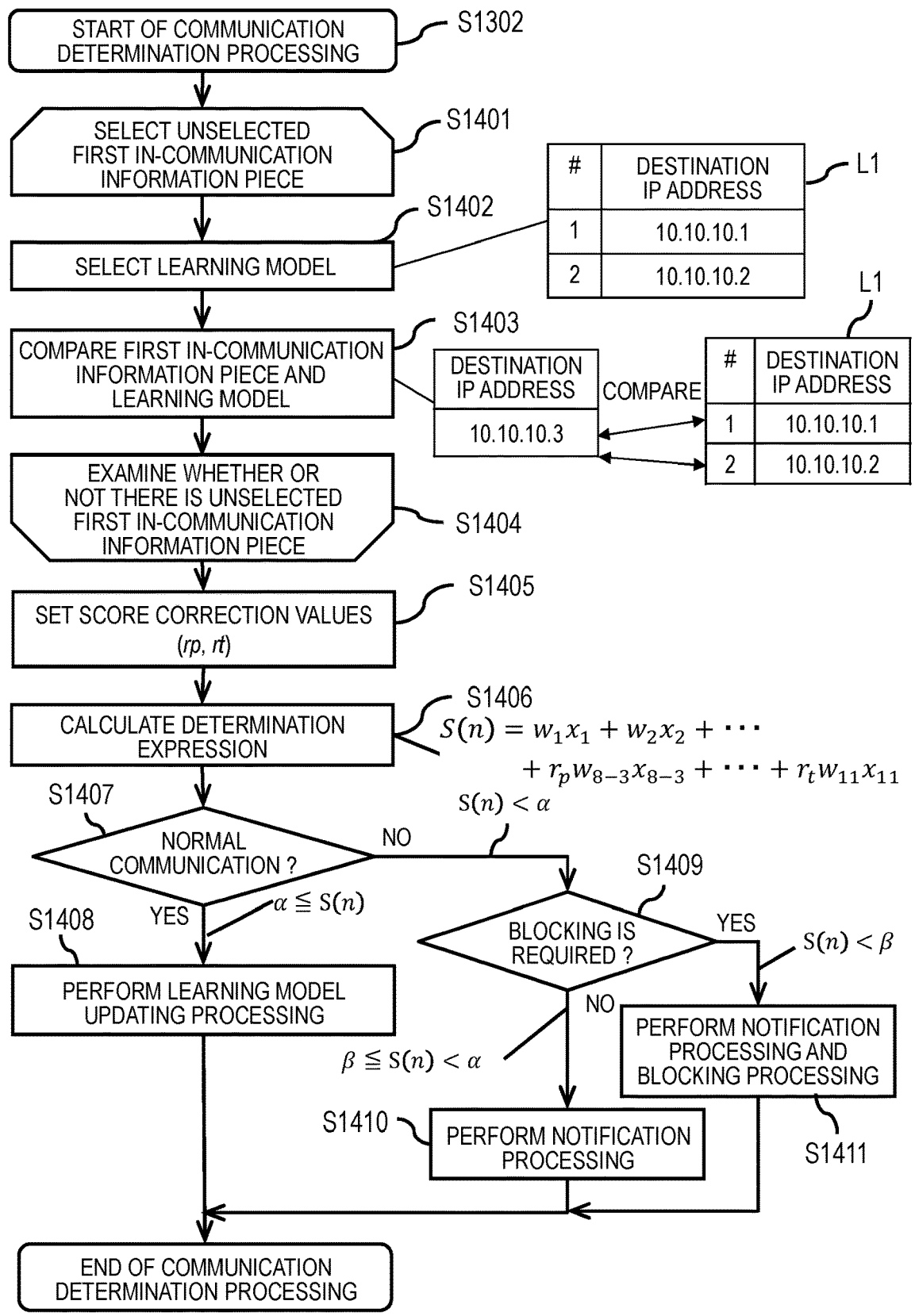
FIG. 14 is a flow chart for illustrating an example of a detailed processing procedure for the communication determination processing (Step S1302) illustrated in FIG. 13.

FIG. 14 is a flow chart for illustrating an example of a detailed processing procedure for the communication determination processing (Step S1302) illustrated in FIG. 13. After acquiring the learning model Ln (Step S1322), the IoT gateway 120 controls the determination module 407 and acquisition module 420 to execute Step S1401 to Step S1407 as the unauthorized communication determination processing (Step S1323) illustrated in FIG. 13.

Specifically, for example, the IoT gateway 120 controls the determination module 407 to select an unselected first in-communication information piece Cn (Step S1401), and select the learning model Ln corresponding thereto (Step S1402). Then, the IoT gateway 120 controls the determination module 407 to compare the selected first in-communication information piece Cn and the selected learning model Ln as illustrated in FIG. 11 (Step S1403).

Regarding the satisfied comparison conditions, as a result of comparing the learning model Ln and the first in-communication information piece Cn, the determination module 407 sets the value of the true or false value $x_n$ of the determination expression of Expression (1) to $x_n=1$ when the comparison conditions are satisfied, and sets the value of the true or false value $x_n$ of the determination expression of Expression (1) to $x_n=0$ for a comparison condition that is not satisfied.

The IoT gateway 120 controls the determination module 407 to examine whether or not there is an unselected first in-communication information piece Cn (Step S1404), and when there is an unselected first in-communication information piece Cn, return to Step S1401 to select the unselected first in-communication information piece Cn. Meanwhile, when there is no unselected first in-communication information piece Cn, all the true or false values $x_n$ of the determination expression of Expression (1) have already been set, and thus the procedure advances to Step S1405.

The IoT gateway 120 uses the value P8-3 of the cumulative packet size C8-3 and the value T11 of the communication time period C11 among the first in-communication information pieces Cn to identify the block including P8-3 and T11 from among the blocks B1 to B9. Then, the IoT gateway 120 acquires the score correction values (rp, rt) of the identified block from the fourth setting file 1700, and sets the score correction values (rp, rt) in the determination expression of Expression (1) (Step S1405).

The IoT gateway 120 controls the determination module 407 to calculate the determination expression of Expression (1) to calculate the score S(n) (Step S1406). Then, the IoT gateway 120 controls the determination module 407 to determine whether or not the communication is normal, in other words, whether or not the calculated score S(n) satisfies the normal state determination conditional expression of Expression (2) (Step S1407). When the normal state determination conditional expression of Expression (2) is satisfied (Yes in Step S1406), as illustrated in Step S1324 of FIG. 13, the IoT gateway 120 controls the determination module 407 to update the learning model Ln (Step S1408), and bring the communication determination processing (Step S1302) to an end.

Meanwhile, when the normal state determination conditional expression of Expression (2) is not satisfied (No in Step S1407), the IoT gateway 120 controls the determination module 407 to determine whether or not the packet is required to be blocked, that is, which one of the detection determination conditional expression of Expression (3) and the blocking determination conditional expression of Expression (4) is satisfied by the calculated score S(n) (Step S1409). When the blocking is not required, that is, the score S(n) satisfies the detection determination conditional expression of Expression (3) (No in Step S1409), as illustrated in Step S1325 and Step S1327 of FIG. 13, the IoT gateway 120 controls the determination module 407 to determine that the possibility of the involvement in unauthorized communication has been detected, and transmit a request for notification of the detection of the possibility of the involvement in unauthorized communication to the notification module 408, and controls the notification module 408 to give a notification to that effect (Step S1409). Then, the IoT gateway 120 brings the communication determination processing to an end (Step S1302).

Meanwhile, when the blocking is required, that is, when the score S(n) satisfies the blocking determination conditional expression of Expression (4) (Yes in Step S1409), as illustrated in Step S1326 and Step S1327 of FIG. 13, the IoT gateway 120 controls the determination module 407 to transmit the request for notification of the blocking of the packet to the notification module 408, and controls the notification module 408 to give a notification to that effect (Step S1327).

In addition, as illustrated in Step S1328 and Step S1329 of FIG. 13, the IoT gateway 120 controls the determination module 407 to transmit the request for blocking the packet to the transmission control module 409, and controls the transmission control module 409 to block the packet (Step S1411). Then, the IoT gateway 120 brings the communication determination processing to an end (Step S1302).

(1) In this manner, the IoT gateway 120 in this embodiment acquires the score correction values (rp, rt) for correcting the determination expression for calculating the score S(n) for determining whether or not the operational data is involved in unauthorized communication, based on a parameter (fluctuation degree 1502) for extending an application range (block B5) of the specific learning models L8-3, L8-4, L11-1, and L11-2 among a plurality of learning models Ln relating to the feature amounts (second in-communication information pieces Cn) of the learning data group and on the specific feature amounts (first in-communication information pieces C8-3 and C11) corresponding to the specific learning models L8-3, L8-4, L11-1, and L11-2 among a plurality of feature amounts (first in-communication information pieces Cn) of the operational data. Further, the IoT gateway 120 calculates the score S(n) by the determination expression based on the plurality of learning models Ln, the plurality of feature amounts (first in-communication information pieces Cn), and the score correction values (rp, rt), determines whether or not the operational data is involved in unauthorized communication based on the calculated score S(n), and controls the transmission of the operational data performed by the transmission module 404 based on the determination result.

For example, when the wireless environment deteriorates, the communication time period is extended due to a decrease in available bandwidth, and the number of retransmission packets increases due to an increase in a packet loss rate, to thereby increase the number of packets received by the IoT gateway 120. The IoT gateway 120 uses such characteristics to estimate the surrounding wireless environment, and uses a correction value for the score corresponding to the pattern of the communication quality of the estimated wireless network to prevent normal communication from being detected and blocked as anomalous communication by handling the fluctuations in the wireless environment. Therefore, it is possible to reduce an erroneous determination rate exhibited when the learning model Ln is used.

(2) Further, in the above-mentioned item (1), when the determination result indicates the involvement in unauthorized communication, the IoT gateway 120 blocks the operational data that has been determined as being involved in unauthorized communication. With this configuration, it is possible to improve the security.

(3) Further, in the above-mentioned item (2), when the score S(n) is lower than the first the threshold value (blocking threshold value β) serving as a reference of the involvement in unauthorized communication, the IoT gateway 120 determines that the operational data is data involved in unauthorized communication, and blocks the operational data that has been determined as being involved in unauthorized communication. With this configuration, the IoT gateway 120 can prioritize the score S(n) based on the learning model Ln over the learning model Ln to block the operational data that has been determined as being involved in unauthorized communication without erroneously transferring the operational data. Therefore, it is possible to suppress erroneous determination performed when the learning model Ln is used.

(4) Further, in the above-mentioned item (2), when the determination result indicates the involvement in unauthorized communication, the IoT gateway 120 notifies the determination result. This allows the user to examine what kind of packet is involved in unauthorized communication and was received at which time point.

(5) Further, in the above-mentioned item (2), the IoT gateway 120 blocks the operational data that has been determined as being involved in unauthorized communication based on the feature amount of the operational data determined as the data involved in unauthorized communication. With this configuration, the IoT gateway 120 can forcedly block the subsequent packet corresponding to the feature amount without waiting for the determination result. Therefore, the IoT gateway 120 can efficiently block the packet involved in unauthorized communication.

(6) Further, in the above-mentioned item (1), when the determination result indicates the possible involvement in unauthorized communication, the IoT gateway 120 avoids blocking the transmission of the operational data that has been determined as being possibly involved in unauthorized communication, which is performed by the transmission module 404, and when the determination result indicates the possible involvement in unauthorized communication, notifies the determination result. With this configuration, it is possible to efficiently transfer the packet that is possibly involved in unauthorized communication, and the user can examine what kind of packet is possibly involved in unauthorized communication and was received at which time point.

(7) Further, in the above-mentioned item (6), the IoT gateway 120 determines the operational data as being possibly involved in unauthorized communication when the score S(n) is equal to or higher than a first threshold value (blocking threshold value β) serving as a reference of the involvement in unauthorized communication and lower than a second threshold value (detection threshold value α higher than the blocking threshold value β) serving as a reference of the possibility of the involvement in unauthorized communication. With this configuration, the IoT gateway 120 can prioritize the score S(n) based on the learning model Ln over the learning model Ln to transfer the operational data that has been determined as being possibly involved in unauthorized communication without erroneously blocking the operational data. Therefore, it is possible to suppress erroneous determination performed when the learning model Ln is used.

(8) Further, in the above-mentioned item (1), when the determination result does not indicate the involvement in unauthorized communication, the IoT gateway 120 avoids blocking the operational data that has been determined as not being involved in unauthorized communication. With this configuration, it is possible to efficiently transfer the packet involved in normal communication.

(9) Further, in the above-mentioned item (8), the IoT gateway 120 determines that the operational data is not involved in unauthorized communication when the score S(n) is equal to or higher than the second threshold value (detection threshold value α) serving as the reference of possibility of the involvement in unauthorized communication. With this configuration, the IoT gateway 120 can prioritize the score S(n) based on the learning model Ln over the learning model Ln to transfer the operational data that has been determined as not being involved in unauthorized communication without erroneously blocking the operational data. Therefore, it is possible to suppress erroneous determination performed when the learning model Ln is used.

(10) Further, in the above-mentioned item (1), every time the operational data is received, the IoT gateway 120 calculates the score S(n) of the operational data by the determination expression. With this configuration, it is possible to prioritize the score S(n) based on the learning model Ln over the learning model Ln for each piece of operational data to reduce the erroneous determination rate exhibited when the learning model Ln is used.

(11) Further, in the above-mentioned item (10), regarding an operational data group obtained after the first-arrival operational data is received until the latest operational data is received, the IoT gateway 120 updates the first in-communication information piece every time the operational data is received, and calculates the score S(n) of the latest operational data by the determination expression based on the updated latest first in-communication information piece. With this configuration, the erroneous determination rate exhibited when the learning model Ln is used can be reduced in real time.

(12) Further, in the above-mentioned item (11), the IoT gateway 120 generates the learning model Ln, calculates the score S(n) of the operational data by the determination expression based on the generated learning model Ln, and determines whether or not the operational data is involved in unauthorized communication based on the calculated score S(n). With this configuration, the learning model Ln generated by the IoT gateway 120 itself can be used to reduce the erroneous determination rate.

(13) Further, in the above-mentioned item (12), regarding the learning data group obtained after first-arrival learning data is received until latest learning data is received, the IoT gateway 120 updates the second in-communication information piece every time the learning data is received, and when the communication of the learning data group is finished, determines the learning model Ln based on the updated latest second in-communication information piece. With this configuration, the IoT gateway 120 can generate the learning model Ln in real time.

(14) Further, in the above-mentioned item (1), in the IoT gateway 120, the transmission module 404 transmits the operational data to destinations (server 111 and IoT device 121) in a wireless communication segment (wireless network 103 and wireless network 122). With this configuration, it is possible to reduce the erroneous determination rate exhibited when the learning model Ln is used, which depends on a change in the wireless environment.

(15) Further, in the above-mentioned item (1), in the IoT gateway 120, the reception module 403 receives the operational data from transmission sources (IoT device 121 and server 111) in a wireless communication segment (wireless network 122 and wireless network 103). With this configuration, it is possible to reduce the erroneous determination rate exhibited when the learning model Ln is used, which depends on a change in the wireless environment.

As has been described above, the IoT gateway 120 of this embodiment learns normal communication through use of the network feature amount Fn that does not depend on a protocol or an application, scores communication different from the normal communication for each network feature amount Fn, and detects unauthorized communication or detects and blocks unauthorized communication. In that case, in correspondence to each IoT system 100, for example, a plant network or a factory network, the weight wn, the detection threshold value α, and the blocking threshold value β can be adjusted for each network feature amount Fn to be used for determination, and hence the unauthorized communication determination can be flexibly applied.

Further, the IoT gateway 120 of this embodiment can detect the possibility of the involvement in unauthorized communication or detect and block unauthorized communication even against a DoS attack (Slow Read DoS) in which the number of packets at regular intervals does not increase based on the determination performed by combining the validity of the IP address, the communication port, and other network feature amount Fn. Therefore, the features of each IoT system 100 can be flexibly handled, and as a result, it is possible to reduce the erroneous determination rate.

Further, the IoT gateway 120 of the above-mentioned embodiment includes the transmission control module 409 between the transmission module 404 and the reception module 403, but may include the transmission control module 409 between the transmission module 404 and the second IF 402.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

What is claimed is:

1. An unauthorized communication detection apparatus, comprising:
    A hardware processor;
    A non-transitory computer readable storage media operatively coupled with the hardware processor, and storing program instructions executed by the hardware processor;
    a reception module configured to receive operational data from a transmission source; a transmission module configured to transmit the operational data received by the reception module to a destination; an acquisition module configured to acquire a correction value for correcting a determination expression for calculating a score for determining whether the operational data is involved in unauthorized communication, based on a parameter of fluctuation degree in a cumulative packet size and a parameter of fluctuation degree in a communication time period for extending an application range of the cumulative packet size and the communication time period of a specific learning model among a plurality of learning models relating to a feature amount of a learning data group and on a specific feature amount corresponding to the specific learning model among a plurality of feature amounts of the operational data received by the reception module; a determination module configured to calculate the score by the determination expression based on the plurality of learning models, the plurality of feature amounts, and the correction value acquired by the acquisition module, and determine whether the operational data is involved in unauthorized communication based on the calculated score; and a transmission control module configured to control the transmission of the operational data performed by the transmission module based on a determination result obtained by the determination module.

2. The unauthorized communication detection apparatus according to claim 1, wherein, when the determination result indicates that the operational data is involved in unauthorized communication, the transmission control module blocks the operational data that has been determined as being involved in unauthorized communication.

3. The unauthorized communication detection apparatus according to claim 2,
    wherein the determination module is configured to determine the operational data as data involved in unauthorized communication when the score is lower than a first threshold value serving as a reference of the involvement in unauthorized communication, and
    wherein the transmission control module is configured to block the operational data that has been determined as being involved in unauthorized communication.

4. The unauthorized communication detection apparatus according to claim 2, further comprising a notification module configured to notify the determination result when the determination result indicates that the operational data is involved in unauthorized communication.

5. The unauthorized communication detection apparatus according to claim 2,
    wherein the determination module is configured to output to the transmission control module the feature amount of the operational data that has been determined as the data involved in unauthorized communication, and
    wherein the transmission control module is configured to block the operational data that has been determined as being involved in unauthorized communication based on the feature amount of the operational data that has been determined as the data involved in unauthorized communication.

6. The unauthorized communication detection apparatus according to claim 1, further comprising a notification module configured to notify the determination result,
    wherein the transmission control module is configured to output, when the determination result indicates a possibility of involvement in unauthorized communication, the operational data that has been determined as being possibly involved in unauthorized communication to the transmission module, and
    wherein the notification module is configured to notify the determination result when the determination result indicates the possibility of the involvement in unauthorized communication.

7. The unauthorized communication detection apparatus according to claim 6, wherein the determination module is configured to determine the operational data as being possibly involved in unauthorized communication when the score is equal to or higher than a first threshold value serving as a reference of the involvement in unauthorized communication and lower than a second threshold value being higher than the first threshold value and serving as a reference of possibility of the involvement in unauthorized communication.

8. The unauthorized communication detection apparatus according to claim 1, wherein the transmission control module is configured to output, when the determination result does not indicate involvement in unauthorized communication, the operational data that has been determined as not being involved in unauthorized communication to the transmission module.

9. The unauthorized communication detection apparatus according to claim 8, wherein the determination module is configured to determine that the operational data is uninvolved in unauthorized communication when the score is equal to or higher than a second threshold value serving as a reference of possibility of involvement in unauthorized communication.

10. The unauthorized communication detection apparatus according to claim 1, wherein the determination module is configured to calculate the score of the operational data by the determination expression every time the operational data is received.

11. The unauthorized communication detection apparatus according to claim 10, further comprising a first generation module configured to generate a first in-communication information piece relating to a cumulative feature amount during communication of the operational data,
- wherein the first generation module is configured to update, regarding an operational data group obtained after first-arrival operational data is received until latest operational data is received, the first in-communication information piece every time the operational data is received, and
- wherein the determination module is configured to calculate the score of the latest operational data by the determination expression based on a latest first in-communication information piece updated by the first generation module.

12. The unauthorized communication detection apparatus according to claim 1, further comprising a second generation module configured to generate the learning model,
- wherein the determination module is configured to calculate the score of the operational data by the determination expression based on the learning model generated by the second generation module, and determine based on the calculated score whether the operational data is involved in unauthorized communication.

13. The unauthorized communication detection apparatus according to claim 12, further comprising a first generation module configured to generate a second in-communication information piece relating to a cumulative feature amount during communication of the learning data group,
- wherein the first generation module is configured to update, regarding the learning data group obtained after first-arrival learning data is received until latest learning data is received, the second in-communication information piece every time the learning data is received, and
- wherein the second generation module is configured to determine the learning model, when communication of the learning data group has been finished, based on a latest second in-communication information piece updated by the first generation module.

14. The unauthorized communication detection apparatus according to claim 1, wherein the transmission module is configured to transmit the operational data to the destination in a wireless communication segment.

15. A non-transitory recording medium having stored thereon a program to be executed by a processor, the non-transitory recording medium being readable by the processor, the non-transitory recording medium having recorded thereon an unauthorized communication detection program for causing the processor to execute:
- reception processing of receiving operational data from a transmission source;
- transmission processing of transmitting the operational data received by the reception processing to a destination;
- acquisition processing of acquiring a correction value for correcting a determination expression for calculating a score for determining whether the operational data is involved in unauthorized communication, based on a parameter of fluctuation degree in a cumulative packet size and a parameter of fluctuation degree in a communication time period for extending an application range of the cumulative packet size and the communication time period of a specific learning model among a plurality of learning models relating to a feature amount of a learning data group and on a specific feature amount corresponding to the specific learning model among a plurality of feature amounts of the operational data received by the reception processing;
- determination processing of calculating the score by the determination expression based on the plurality of learning models, the plurality of feature amounts, and the correction value acquired by the acquisition processing, and determining whether the operational data is involved in unauthorized communication based on the calculated score; and
- transmission control processing of controlling the transmission of the operational data performed by the transmission processing based on a determination result obtained by the determination processing.

* * * * *